US012482446B2

(12) United States Patent
Chen et al.

(10) Patent No.: US 12,482,446 B2
(45) Date of Patent: Nov. 25, 2025

(54) AUDIO DEVICE WITH DISTRACTOR SUPPRESSION

(71) Applicant: British Cayman Islands Intelligo Technology Inc., Grand Cayman (KY)

(72) Inventors: Ting-Yao Chen, Zhubei (TW); Chen-Chu Hsu, Zhubei (TW); Yao-Chun Liu, Zhubei (TW); Tsung-Liang Chen, Zhubei (TW)

(73) Assignee: BRITISH CAYMAN ISLANDS INTELLIGO TECHNOLOGY INC., Grand Cayman (KY)

( * ) Notice: Subject to any disclaimer, the term of this patent is extended or adjusted under 35 U.S.C. 154(b) by 320 days.

(21) Appl. No.: 18/448,514

(22) Filed: Aug. 11, 2023

(65) Prior Publication Data

US 2025/0054479 A1 Feb. 13, 2025

(51) Int. Cl.
*G10K 11/175* (2006.01)
*H04R 1/10* (2006.01)

(52) U.S. Cl.
CPC ....... *G10K 11/1754* (2020.05); *H04R 1/1083* (2013.01); *G10K 2210/1081* (2013.01);
(Continued)

(58) Field of Classification Search
CPC ....... G10K 11/1754; G10K 2210/1081; G10K 2210/3012; G10K 2210/3038;
(Continued)

(56) References Cited

U.S. PATENT DOCUMENTS 8,229,127 B2 7/2012 Jorgensen et al.
10,542,354 B2 1/2020 Tiefenau et al.
(Continued)

FOREIGN PATENT DOCUMENTS

CN 111584065 A 8/2020
CN 111916101 A 11/2020
(Continued)

OTHER PUBLICATIONS

Staab, “Hearing Aid Delay,” https://hearinghealthmatters.org/waynesworld/2016/hearingaid-delay/, dated Jan. 19, 2016, 7 pages.
(Continued)

*Primary Examiner* — David L Ton
(74) *Attorney, Agent, or Firm* — MUNCY, GEISSLER, OLDS & LOWE, P.C.

(57) ABSTRACT

An audio device is disclosed, comprising multiple microphones and an audio module. The multiple microphones generate multiple audio signals. The audio module coupled to the multiple microphones comprises a processor, a storage media and a post-processing circuit. The storage media includes instructions operable to be executed by the processor to perform operations comprising: producing multiple instantaneous relative transfer functions (IRTFs) using a known adaptive algorithm according to multiple spectral representations for multiple first sample values in current frames of the multiple audio signals; and, performing distractor suppression over the multiple spectral representations and the multiple IRTFs using an end-to-end neural network to generate a compensation mask. The post-processing circuit generates an audio output signal according to the compensation mask. Each IRTF represents a difference in sound propagation between each predefined microphone and a reference microphone of the microphones relative to sound sources.

35 Claims, 19 Drawing Sheets

(52) U.S. Cl.
CPC ................ *G10K 2210/3012* (2013.01); *G10K 2210/3038* (2013.01); *G10K 2210/3045* (2013.01); *H04R 2460/01* (2013.01)

(58) Field of Classification Search
CPC .......... G10K 2210/3045; H04R 1/1083; H04R 1/406; H04R 3/005; H04R 3/02; H04R 2460/01
See application file for complete search history.

(56) References Cited

U.S. PATENT DOCUMENTS

| | | | |
|---|---|---|---|
| 10,805,740 B1 | 10/2020 | Snyder | |
| 11,647,344 B2 | 5/2023 | Chen et al. | |
| 12,347,449 B2 * | 7/2025 | Mosayyebpour Kaskari .............. | G10L 21/0208 |
| 2007/0269066 A1 | 11/2007 | Derleth et al. | |
| 2014/0177857 A1 | 6/2014 | Kuster | |
| 2014/0270290 A1 | 9/2014 | Cheung | |
| 2020/0221236 A1 | 7/2020 | Jensen et al. | |
| 2021/0012767 A1 * | 1/2021 | Kupryjanow ....... | G10L 21/0208 |
| 2021/0125625 A1 | 4/2021 | Huang et al. | |
| 2021/0329388 A1 | 10/2021 | Zahedi et al. | |
| 2021/0335336 A1 | 10/2021 | Rule | |
| 2022/0044696 A1 | 2/2022 | Kim et al. | |
| 2022/0256295 A1 | 8/2022 | Pedersen et al. | |
| 2022/0256303 A1 * | 8/2022 | Sharma ..................... | G01S 5/18 |
| 2023/0083192 A1 | 3/2023 | Hoang et al. | |
| 2023/0283951 A1 * | 9/2023 | Lai ......................... | H04R 3/005 381/92 |

FOREIGN PATENT DOCUMENTS

| | | |
|---|---|---|
| WO | WO2021/043248 A1 | 3/2021 |
| WO | WO2023/093412 A1 | 6/2023 |

OTHER PUBLICATIONS

Balling et al., "Reducing hearing aid delay for optimal sound quality: a new paradigm in processing", https://www.hearingreview.com/hearingproducts/hearing-aids/bte/reducing-hearing-aid-delay-for-optimalsound-quality-a-new-paradigm-in-processing, dated Apr. 23, 2020, 11 pages.

Zheng et al., "Air- and bone-conductive integrated microphones for robust speech detection and enhancement," IEEE Conference, Jan. 2003,7 pages.

Zhou et al. "A Robust Dual-Microphone Generalized Sidelobe Canceller Using a Bone-Conduction Sensor for Speech Enhancement," Sensors,MDPI-1878, 2021,16 pages.

Huang et al., "A wearable bone-conducted speech enhancement system for strong background noises," 18$^{th}$ Int'l Conference on Electronic Packaging Tecnology, 2017, IEEE, pp. 1682-1684.

Cohen, "Relative Transfer Function Identification Using Speech Signals," IEEE Transaction on Speech and Audio Processing, vol. 12 No. 5, Sep. 2004, pp. 451-459.

Yang et al., "Enhancing direct-path relative transfer function using deep neural network for robust sound source localization," CAAI Transaction on Intelligence Technology, 2021, pp. 1-9.

Erdogan et al., "Improved MVDR beamforming using single-channel mask prediction networks," Mitsubishi Electric Research Laboratories, Sep. 2016, 7 pages.

Zhang et al., "A Deep Learning Approach to Active Noise Control," Interspeech 2000, 2020, Computer Science, pp. 1141-1145.

* cited by examiner

AUDIO DEVICE WITH DISTRACTOR SUPPRESSION

BACKGROUND OF THE INVENTION

Field of the Invention

The invention relates to audio devices, and more particularly, to an audio device with an end-to-end neural network for suppressing distractor speech.

Description of the Related Art

No matter how good a hearing aid is, it always sounds like a hearing aid. A significant cause of this is the "comb-filter effect," which arises because the digital signal processing in the hearing aid delays the amplified sound relative to the leak-path/direct sound that enters the ear through venting in the ear tip and any leakage around it. As well known in the art, the sound through the leak path (i.e., direct sound) can be removed by introducing Active Noise Cancellation (ANC). After the direct sound is cancelled, the comb-filter effect would be mitigated. Theoretically, the ANC circuit may operate in time domain or frequency domain. Normally, the ANC circuit in the hearing aid includes one or more time-domain filters because the signal processing delay of the ANC circuit is typically required to be less than 50 μs. For the ANC circuit operating in frequency domain, the short-time Fourier Transform (STFT) and the inverse STFT processes contribute the signal processing delays ranging from 5 to 50 milliseconds (ms), which includes the effect of ANC circuit. However, most state-of-the-art audio algorithms manipulate audio signals in frequency domain for advanced audio signal processing.

On the other hand, although conventional artificial intelligent (AI) noise suppressor can suppress non-voice noise, such as traffic and environment noise, it is difficult to suppress distractor speech. The most critical case is that a speech distractor 230 is located at 0 degree relative to a user 210 carrying a smart phone 220 and wearing a pair of wireless earbuds 240, as shown in FIG. 1A. In the example of FIG. 1A, the traditional beamforming and noise suppression techniques fail to suppress the distractor speech due to the fact that the directions of the distractor speech and the user's speech coincide.

What is needed is an audio device for integrating time-domain and frequency-domain audio signal processing, performing ANC, advanced audio signal processing, acoustic echo cancellation and distractor suppression, and improving audio quality.

SUMMARY OF THE INVENTION

In view of the above-mentioned problems, an object of the invention is to provide an audio device capable of suppressing distractor speech, cancelling acoustic echo and improving audio quality.

One embodiment of the invention provides an audio device. The audio device comprises: multiple microphones and an audio module. The multiple microphones generate multiple audio signals. The audio module coupled to the multiple microphones comprises at least one processor, at least one storage media and a post-processing circuit. The at least one storage media includes instructions operable to be executed by the at least one processor to perform operations comprising: producing multiple instantaneous relative transfer functions (IRTFs) using a known adaptive algorithm according to multiple mic spectral representations for multiple first sample values in current frames of the multiple audio signals; and, performing distractor suppression over the multiple mic spectral representations and the multiple IRTFs using an end-to-end neural network to generate a compensation mask. The post-processing circuit generates an audio output signal according to the compensation mask. Each IRTF represents a difference in sound propagation between each predefined microphone and a reference microphone of the multiple microphones relative to at least one sound source. Each predefined microphone is different from the reference microphone.

Another embodiment of the invention provides an audio apparatus. The audio apparatus comprises: two audio devices that are arranged at two different source devices. The two output audio signals from the two audio devices are respectively sent to a sink device over a first connection link and a second connection link.

Another embodiment of the invention provides an audio processing method. The audio processing method comprises: producing multiple instantaneous relative transfer functions (IRTFs) using a first known adaptive algorithm according to multiple mic spectral representations for multiple first sample values in current frames of multiple audio signals from multiple microphones; performing distractor suppression over the multiple mic spectral representations and the multiple IRTFs using an end-to-end neural network to generate a compensation mask; and, obtaining an audio output signal according to the compensation mask; wherein each IRTF represents a difference in sound propagation between each predefined microphone and a reference microphone of the multiple microphones relative to at least one sound source. Each predefined microphone is different from the reference microphone.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1A:
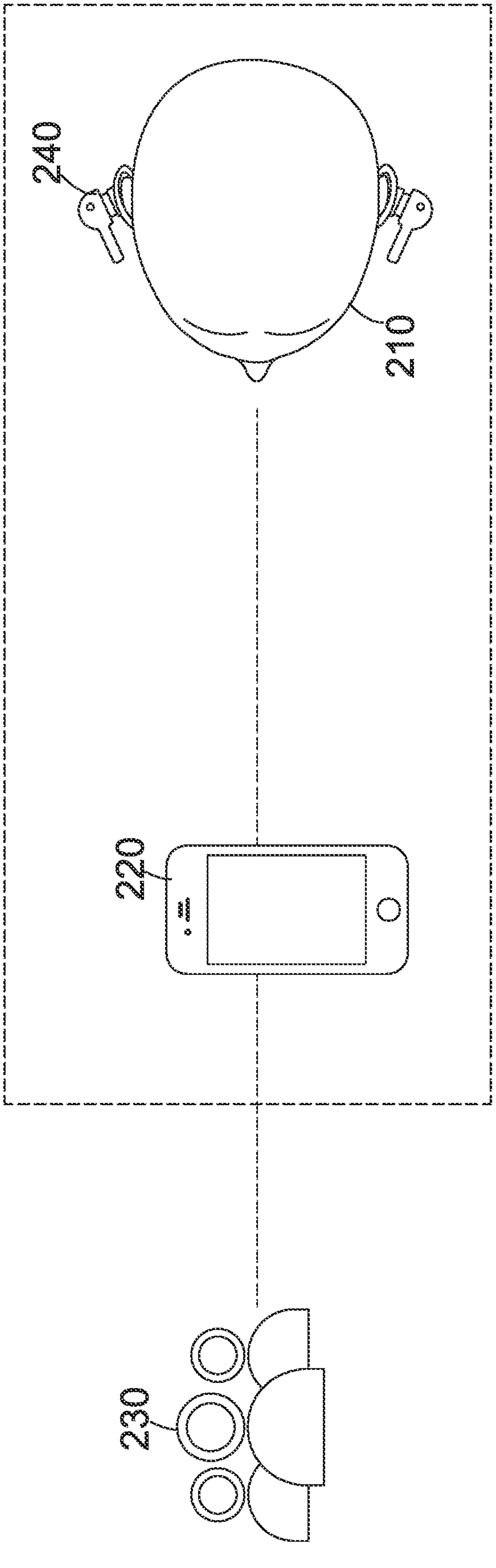
FIG. 1A (Prior Art)
FIG. 1A is an example showing a position relationship between a speech distractor 230 and a user 210 carrying a smart phone 220 and wearing a pair of wireless earbuds 240.

As used herein and in the claims, the term "and/or" includes any and all combinations of one or more of the associated listed items. The use of the terms "a" and "an" and "the" and similar referents in the context of describing the invention are to be construed to cover both the singular and the plural, unless otherwise indicated herein or clearly contradicted by context. Throughout the specification, the same components with the same function are designated with the same reference numerals.

As used herein and in the claims, the term "sink device" refers to a device implemented to establish a first connection link with one or two source devices so as to receive audio data from the one or two source devices, and implemented to establish a second connection link with another sink device so as to transmit audio data to the another sink device. Examples of the sink device include, but are not limited to, a personal computer, a laptop computer, a mobile device, a wearable device, an Internet of Things (IoT) device/hub and an Internet of Everything (IoE) device/hub. The term "source device" refers to a device having an embedded microphone and implemented to originate, transmit and/or receive audio data over connection links with the other source device or the sink device. Examples of the source device include, but are not limited to, a headphone, an earbud and one side of a headset. The type of headphones and the headset includes, but not limited, over-ear, on-ear, clip-on and in-ear-monitor. The source device, the sink device and the connection links can be either wired or wireless. A wired connection link is made using a transmission line or cable. A wireless connection link can occur over any suitable communication link/network that enables the source devices and the sink device to communicate with each other over a communication medium. Examples of protocols that can be used to form communication links/networks can include, but are not limited to, near-field communication (NFC) technology, radio-frequency identification (RFID) technology, Bluetooth, Bluetooth Low Energy (BLE), Wi-Fi technology, the Internet Protocol ("IP") and Transmission Control Protocol ("TCP").

A feature of the invention is to use an end-to-end neural network to simultaneously perform ANC functions, and advanced audio signal processing, e.g., noise suppression, acoustic feedback cancellation (AFC), sound amplification, distractor suppression and acoustic echo cancellation (AEC) and so on. Another feature of the invention is that the end-to-end neural network receives a time-domain audio signal and a frequency-domain audio signal for each microphone so as to gain the benefits of both time-domain signal processing (e.g., extremely low system latency) and frequency-domain signal processing (e.g., better frequency analysis). In comparison with the conventional ANC technology that is most effective on lower frequencies of sound, e.g., between 50 to 1000 Hz, the end-to-end neural network of the invention can reduce both the high-frequency noise and low-frequency noise. Another feature of the invention is to use multiple microphone signals from one or two source devices or/and a sink device and multiple IRTFs (will be described below) to suppress the distractor speech 230 in FIG. 1A. Another feature of the invention is to use multiple microphone signals from one or two source devices or/and a sink device, a playback audio signal for a loudspeaker in a source device, the multiple IRTFs and multiple playback transfer functions (PTFs) (will be described below) to perform acoustic echo cancellation.

Figure 1:
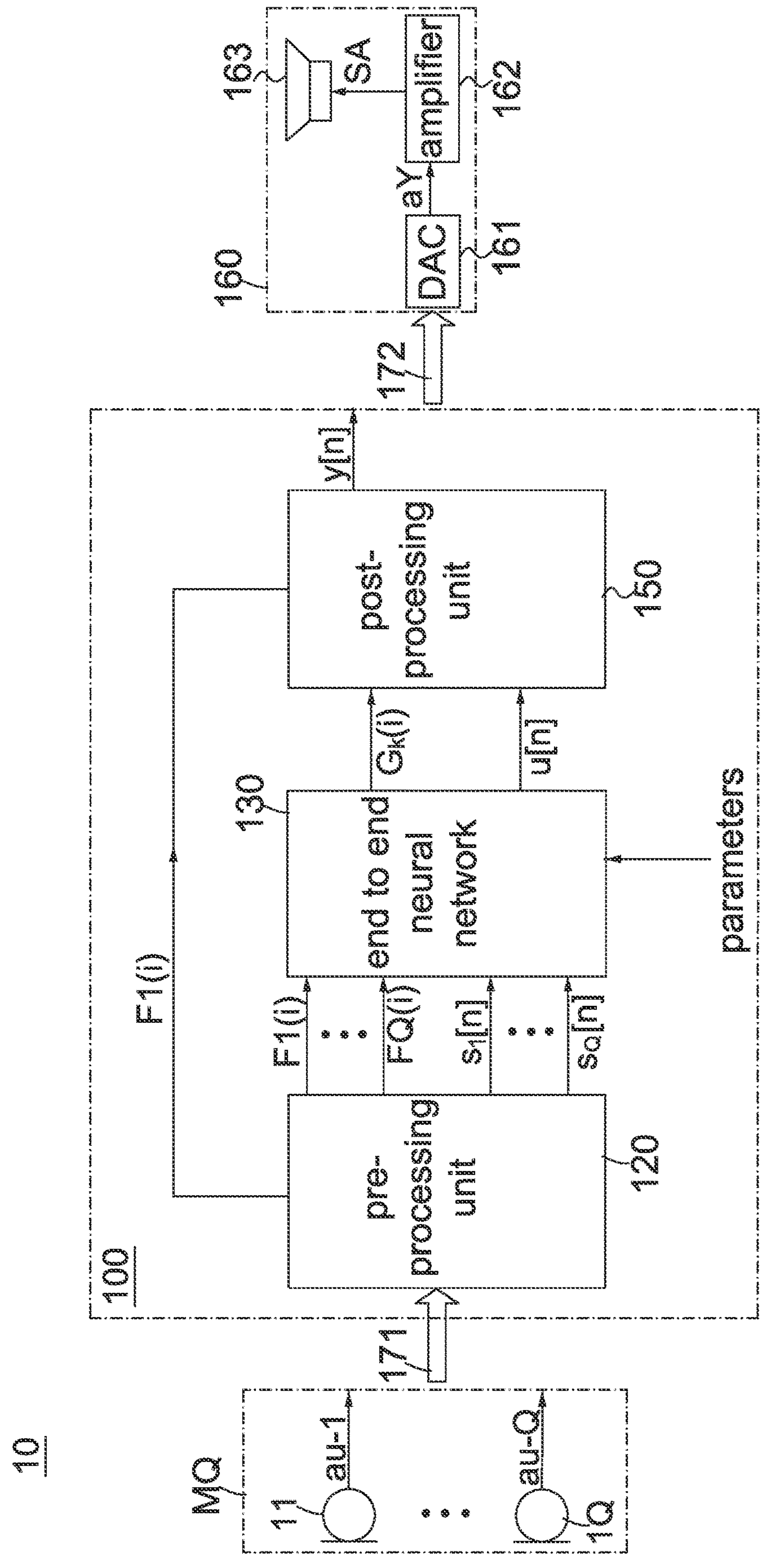
FIG. 1 is a schematic diagram of an audio device according to a first embodiment of the invention.

FIG. 1 is a schematic diagram of an audio device according to a first embodiment of the invention. Referring to FIG. 1, the audio device 10 of the invention includes a microphone set MQ, an audio module 100, multiple connection links 171~172 and an audio output circuit 160, where Q>=2. The microphone set MQ includes a number Q of microphones 11~1Q placed at one or two source devices or/and a sink device. The audio module 100 may be placed at a source device or a sink device. The audio module 100 includes a pre-processing unit 120, an end-to-end neural network 130 and a post-processing unit 150. The input terminals of the pre-processing unit 120 are coupled to the microphone set MQ over one or two connection links 171, such as one or two transmission lines or one or two Bluetooth or WiFi communication links. The microphones 11~1Q include, but are not limited to, air conduction (AC) microphones and bone conduction (BC) microphones (also known as bone-conduction sensors or voice pickup bone sensors).

In an embodiment, the audio device 10/60/70 may be a hearing aid, e.g. of the behind-the-ear (BTE) type, in-the-ear (ITE) type, in-the-canal (ITC) type, or completely-in-the-canal (CIC) type. The microphones 11~1Q are used to collect ambient sound to generate Q audio signals au-1~au-Q. The pre-processing unit 120 is configured to receive the Q audio signals au-1~au-Q and generate audio data of current frames i of Q time-domain digital audio signals $s_1[n]$~$s_Q[n]$ and Q current spectral representations F1($i$)~FQ(i) corresponding to the audio data of the current frames i of time-domain digital audio signals $s_1[n]$~$s_Q[n]$, where n denotes the discrete time index and i denotes the frame index of the time-domain digital audio signals $s_1[n]$~$s_Q[n]$. The end-to-end neural network 130 receives input parameters, the Q current spectral representations F1($i$)~FQ(i), and audio data for current frames i of the Q time-domain signals $s_1$[n]~$s_Q$[n], performs ANC and AFC functions, noise suppression and sound amplification to generate a frequency-domain compensation mask stream $G_1(i)$~$G_N$(i) and audio data of the current frame i of a time-domain digital data stream u[n]. The post-processing unit 150 receives the frequency-domain compensation mask 20) stream $G_1(i)$~$G_N$ (i) and audio data of the current frame i of the time-domain data stream u[n] to generate audio data for the current frame i of a time-domain digital audio signal y[n], where N denotes the Fast Fourier transform (FFT) size. The output terminal of the post-processing unit 150 is coupled to the audio output circuit 160 via a connection link 172, such as a transmission line or a Bluetooth/WiFi communication link. Finally, the audio output circuit 160 placed at a sink device or a source device converts the digital audio signal y[n] from the second connection link 172 into a sound pressure signal. Please note that the first connection links 171 and the second connection link 172 are not necessarily the same, and the audio output circuit 160 is optional.

Figure 2:
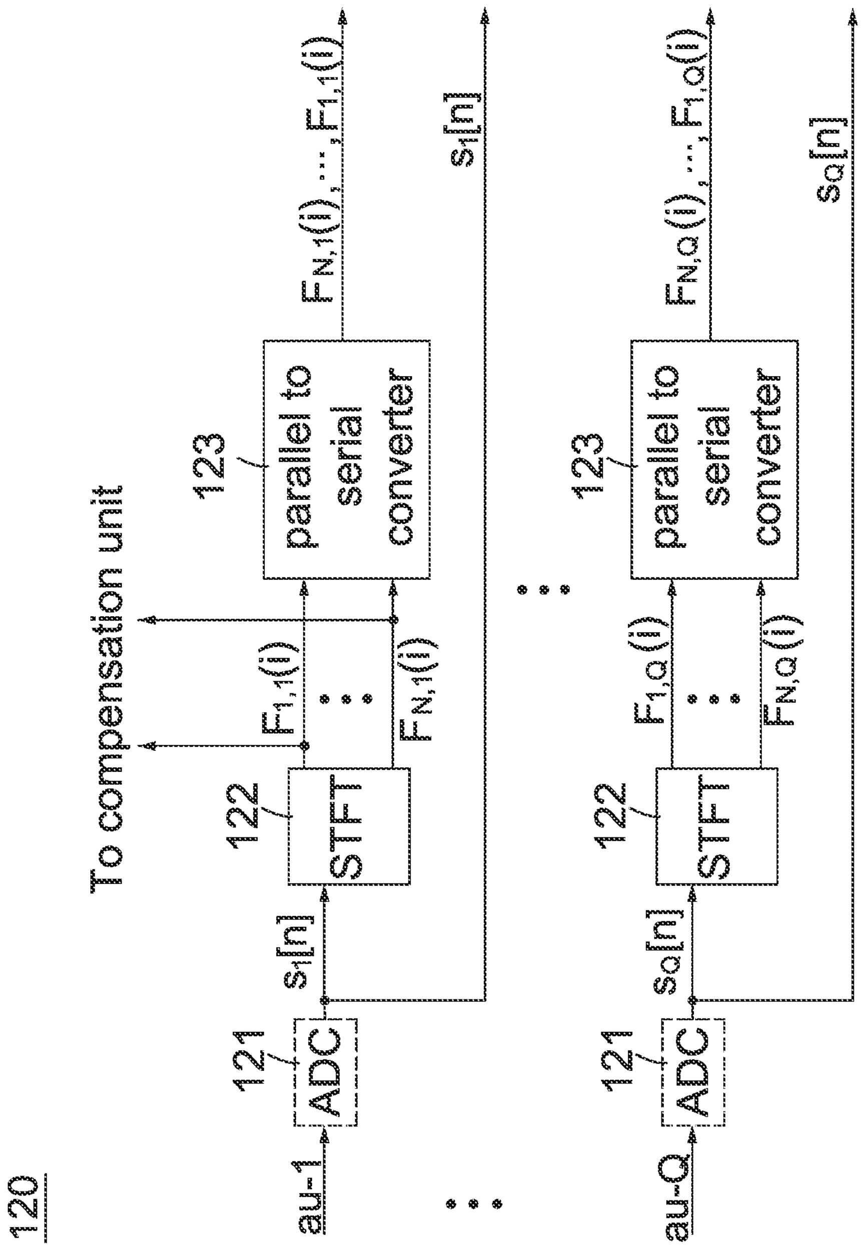
FIG. 2 is a schematic diagram of the pre-processing unit 120 according to an embodiment of the invention.

FIG. 2 is a schematic diagram of the pre-processing unit 120 according to an embodiment of the invention. Referring to FIG. 2, if the outputs of the Q microphones 11~1Q are analog audio signals, the pre-processing unit 120 includes Q analog-to-digital converters (ADC) 121, Q STFT blocks 122 and Q parallel-to-serial converters (PSC) 123; if the outputs of the Q microphones 11~1Q are digital audio signals, the pre-processing unit 120 only includes Q STFT blocks 122 and Q PSC 123. Thus, the ADCs 121 are optional and represented by dash lines in FIG. 2. The ADCs 121 respectively convert Q analog audio signals (au-1~au-Q) into Q digital audio signals ($s_1$[n]~$s_Q$[n]). In each STFT block 122, the digital audio signal $s_j$[n] is firstly broken up into frames using a sliding widow along the time axis so that the frames overlap each other to reduce artifacts at the boundary, and then, the audio data in each frame in time domain is transformed by FFT into complex-valued data in frequency domain. Assuming a number of sampling points in each frame (or the FFT size) is N, the time duration for each frame is Td and the frames overlap each other by Td/2, each STFT block 122 divides the audio signal $s_j$[n] into a plurality of frames and computes the FFT of audio data in the current frame i of a corresponding audio signal $s_j$[n] to generate a current spectral representation Fj(i) having N complex-valued samples ($F_{1,j}$(i)~$F_{N,j}$(i)) with a frequency resolution of fs/N(=1/Td), where 1<=j<=Q. Here, fs denotes a sampling frequency of the digital audio signal $s_j$[n] and each frame corresponds to a different time interval of the digital audio signal $s_j$[n]. In a preferred embodiment, the time duration Td of each frame is about 32 milliseconds (ms). However, the above time duration Td is provided by way of example and not limitation of the invention. In actual implementations, other time duration Td may be used. Finally, each PSC 123 converts the corresponding N parallel complex-valued samples ($F_{1,j}$(i)~$F_{N,j}$(i)) into a serial sample stream, starting from $F_{1,j}$(i) and ending with $F_{N,j}$(i). Please note that the 2*Q data streams F1($i$)~FQ(i) and $s_1$[n]~$s_Q$[n] outputted from the pre-processing unit 120 are synchronized so that 2*Q elements in each column (e.g., $F_{1,1}(i)$, $s_1$[1], . . . , $F_{1,Q}$(i), $s_Q$[1] in one column) from the 2*Q data streams F1($i$)~FQ(i) and $s_1$[n]~$s_Q$[n] are aligned with each other and sent to the end-to-end neural network 130 at the same time.

The end-to-end neural network 130/630/730 may be implemented by a deep neural network (DNN), a convolutional neural network (CNN), a recurrent neural network (RNN), a time delay neural network (TDNN) or any combination thereof. Various machine learning techniques associated with supervised learning may be used to train a model of the end-to-end neural network 130/630/730 (hereinafter called "model 130/630/730" for short). Example supervised learning techniques to train the end-to-end neural network 130/630/730 include, without limitation, stochastic gradient descent (SGD). In supervised learning, a function $f$ (i.e., the model 130) is created by using four sets of labeled training examples (will be described below), each of which consists of an input feature vector and a labeled output. The end-to-end neural network 130 is configured to use the four sets of labeled training examples to learn or estimate the function $f$ (i.e., the model 130), and then to update model weights using the backpropagation algorithm in combination with cost function. Backpropagation iteratively computes the gradient of cost function relative to each weight and bias, then updates the weights and biases in the opposite direction of the gradient, to find a local minimum. The goal of a learning in the end-to-end neural network 130 is to minimize the cost function given the four sets of labeled training examples.

Figure 3:
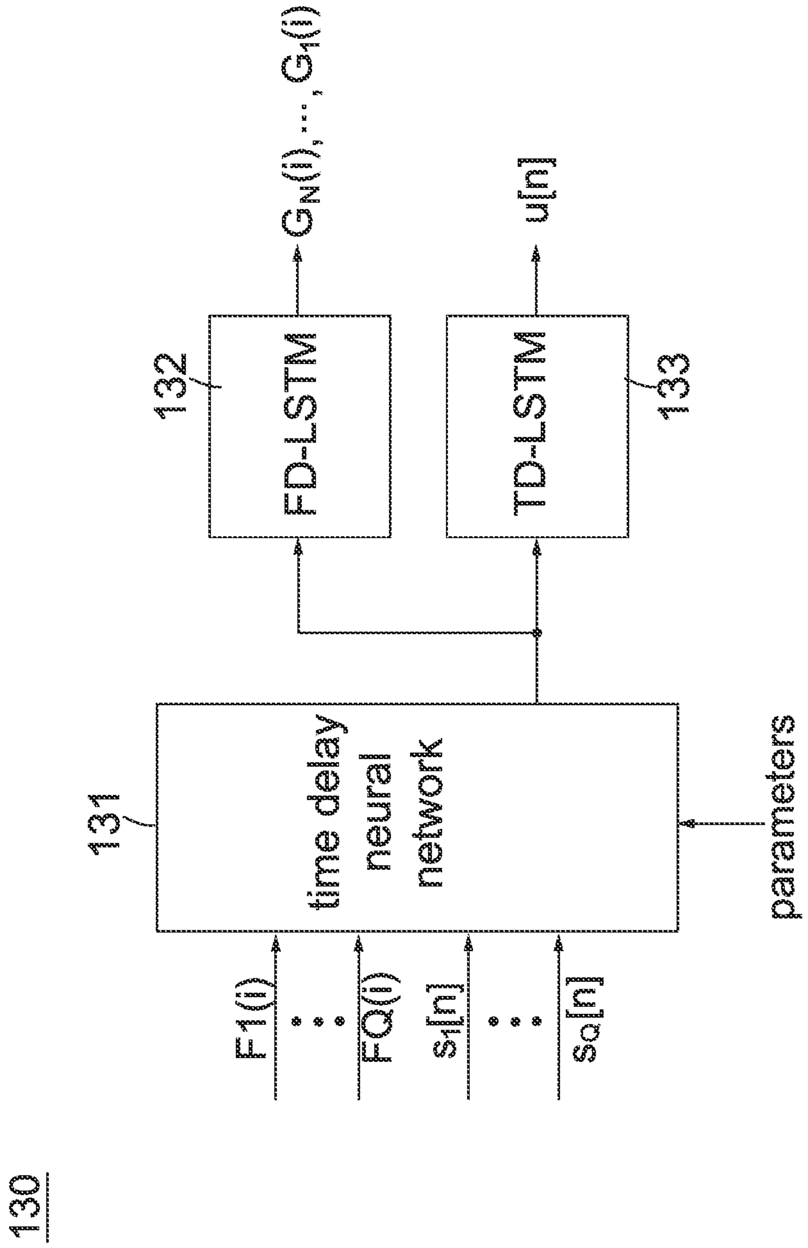
FIG. 3 is a schematic diagram of an end-to-end neural network 130 according to an embodiment of the invention.

FIG. 3 is a schematic diagram of an end-to-end neural network 130 according to an embodiment of the invention. In a preferred embodiment, referring to FIG. 3, the end-to-end neural network 130/630/730 includes a time delay neural network (TDNN) 131, a frequency-domain long short-term memory (FD-LSTM) network 132 and a time-domain long short-term memory (TD-LSTM) network 133. In this embodiment, the TDNN 131 with "shift-invariance" property is used to process time series audio data. The significance of shift invariance is that it avoids the difficulties of automatic segmentation of the speech signal to be recognized by the uses of layers of shifting time-windows. The LSTM networks 132~133 have feedback connections and thus are well-suited to processing and making predictions based on time series audio data, since there can be lags of unknown duration between important events in a time series. Besides, the TDNN 131 is capable of extracting short-term (e.g., less than 100 ms) audio features such as magnitudes, phases, pitches and non-stationary sounds, while the LSTM networks 132~133 are capable of extracting long-term (e.g., ranging from 100 ms to 3 seconds) audio features such as scenes, and sounds correlated with the scenes. Please be noted that the above embodiment (TDNN 131 with FD-LSTM network 132 and TD-LSTM network 133) is provided by way of example and not limitations of the invention. In actual implementations, any other type of neural networks can be used and this also falls in the scope of the invention.

According to the input parameters, the end-to-end neural network 130 receives the Q current spectral representations F1($i$)~FQ(i) and audio data of the current frames i of Q time-domain input streams $s_1$[n]~$s_Q$[n] in parallel, performs ANC function and advanced audio signal processing and generates one frequency-domain compensation mask stream (including N mask values $G_1(i)$~$G_N$(i)) corresponding to N frequency bands and audio data of the current frame i of one time-domain output sample stream u[n]. Here, the advanced audio signal processing includes, without limitations, noise suppression, AFC, sound amplification, alarm-preserving, environmental classification, direction of arrival (DOA) and beamforming, speech separation and wearing detection. For purpose of clarity and ease of description, the following embodiments are described with the advanced audio signal processing only including noise suppression, AFC, and sound amplification. However, it should be understood that the embodiments of the end-to-end neural network 130 are not so limited, but are generally applicable to other types of audio signal processing, such as environmental classification, direction of arrival (DOA) and beamforming, speech separation and wearing detection.

For the sound amplification function, the input parameters for the end-to-end neural network 130 include, with limitations, magnitude gains, a maximum output power value of the signal z[n] (i.e., the output of inverse STFT 154) and a set of N modification gains $g_1$~$g_N$ corresponding to N mask values $G_1(i)$~$G_N$(i), where the N modification gains $g_1$~$g_N$ are used to modify the waveform of the N mask values $G_1(i)$~$G_N$(i). For the noise suppression, AFC and ANC functions, the input parameters for the end-to-end neural network 130 include, with limitations, level or strength of suppression. For the noise suppression function, the input data for a first set of labeled training examples are constructed artificially by adding various noise to clean speech data, and the ground truth (or labeled output) for each example in the first set of labeled training examples requires a frequency-domain compensation mask stream (including N mask values $G_1(i)$~$G_N$(i)) for corresponding clean speech data. For the sound amplification function, the input data for a second set of labeled training examples are weak speech data, and the ground truth for each example in the second set of labeled training examples requires a frequency-domain compensation mask stream (including N mask values $G_1(i)$~$G_N$(i)) for corresponding amplified speech data based on corresponding input parameters (e.g., including a corresponding magnitude gain, a corresponding maximum output power value of the signal z[n] and a corresponding set of N modification gains $g_1$~$g_N$). For the AFC function, the input data for a third set of labeled training examples are constructed artificially by adding various feedback interference data to clean speech data, and the ground truth for each example in the third set of labeled training examples requires a frequency-domain compensation mask stream (including N mask values $G_1(i)$~$G_N$(i)) for corresponding clean speech data. For the ANC function, the input data for a fourth set of labeled training examples are constructed artificially by adding the direct sound data to clean speech data, the ground truth for each example in the fourth set of labeled training examples requires N sample values of the time-domain denoised audio data u[n] for corresponding clean speech data. For speech data, a wide range of people's speech is collected, such as people of different genders, different ages, different races and different language families. For noise data, various sources of noise are used, including markets, computer fans, crowd, car, airplane, construction, etc. For the feedback interference data, interference data at various coupling levels between the loudspeaker 163 and the microphones 11~1Q are collected. For the direct sound data, the sound from the inputs of the audio devices to the user eardrums among a wide range of users are collected. During the process of artificially constructing the input data, each of the noise data, the feedback interference data and the direct sound data is mixed at different levels with the clean speech data to produce a wide range of SNRs for the four sets of labeled training examples.

Regarding the end-to-end neural network 130, in a training phase, the TDNN 131 and the FD-LSTM network 132 are jointly trained with the first, the second and the third sets of labeled training examples, each labeled as a corresponding frequency-domain compensation mask stream (including N mask values $G_1(i)$~$G_N$(i)); the TDNN 131 and the TD-LSTM network 133 are jointly trained with the fourth set of labeled training examples, each labeled as N corresponding time-domain audio sample values. When trained, the TDNN 131 and the FD-LSTM network 132 can process new unlabeled audio data, for example audio feature vectors, to generate N corresponding frequency-domain mask values $G_1(i)$~$G_N$(i) for the N frequency bands while the TDNN 131 and the TD-LSTM network 133 can process new unlabeled audio data, for example audio feature vectors, to generate N corresponding time-domain audio sample values for the current frame i of the signal u[n]. In one embodiment, the N mask values $G_1(i)$~$G_N$(i) are N band gains (being bounded between Th1 and Th2; Th1<Th2) corresponding to the N frequency bands in the current spectral representations F1($i$)~FQ(i). Thus, if any band gain value $G_k$(i) gets close to Th1, it indicates the signal on the corresponding frequency band k is noise-dominant; if any band gain value $G_k$(i) gets close to Th2, it indicates the signal on the corresponding frequency band k is speech-dominant. When the end-to-end neural network 130 is trained, the higher the SNR value in a frequency band k is, the higher the band gain value $G_k$(i) in the frequency-domain compensation mask stream becomes.

In brief, the low latency of the end-to-end neural network 130 between the time-domain input signals $s_1$[n]~$s_Q$[n] and the responsive time-domain output signal u[n] fully satisfies the ANC requirements (i.e., less than 50 μs). In addition, the end-to-end neural network 130 manipulates the input current spectral representations F1($i$)~FQ(i) in frequency domain to achieve the goals of noise suppression, AFC and sound amplification, thus greatly improving the audio quality. Thus, the framework of the end-to-end neural network 130 integrates and exploits cross domain audio features by leveraging audio signals in both time domain and frequency domain to improve hearing aid performance.

Figure 4:
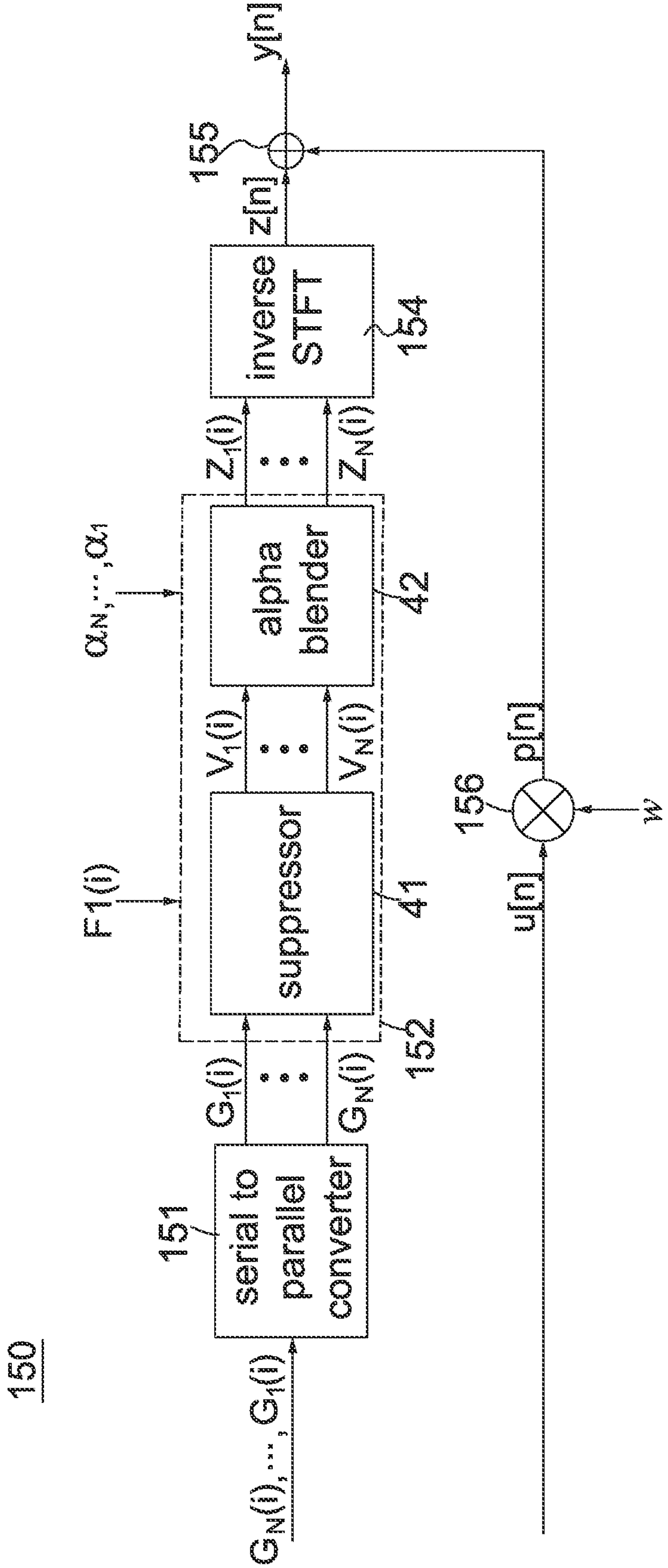
FIG. 4 is a schematic diagram of the post-processing unit 150 according to an embodiment of the invention.
Figure 5:
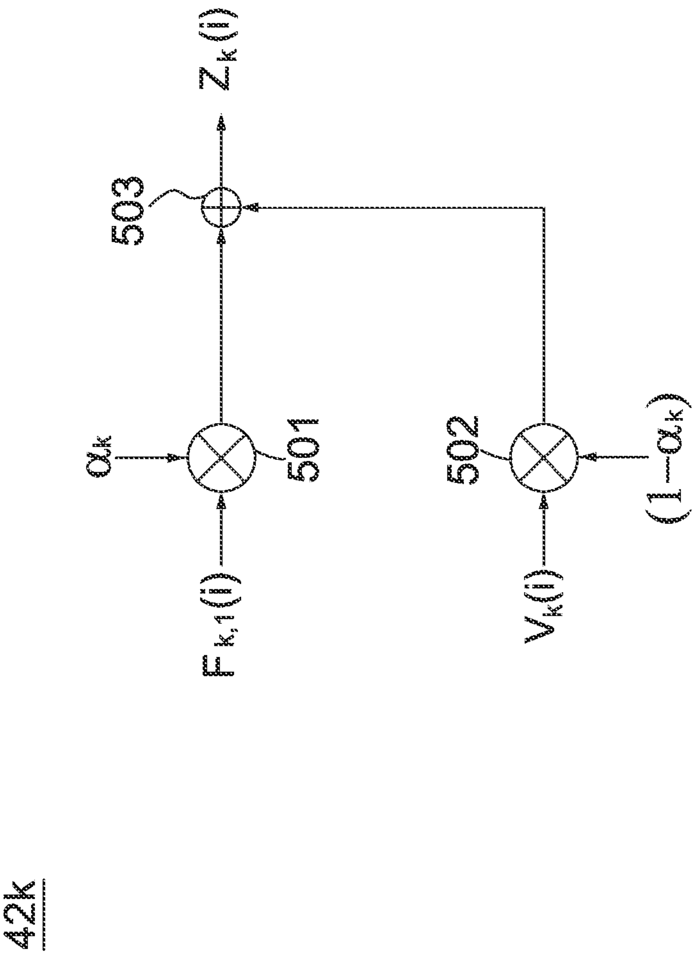
FIG. 5 is a schematic diagram of the blending unit **42*k*** according to an embodiment of the invention.

FIG. 4 is a schematic diagram of the post-processing unit 150 according to an embodiment of the invention. Referring to FIG. 4, the post-processing unit 150 includes a serial-to-parallel converter (SPC) 151, a compensation unit 152, an inverse STFT block 154, an adder 155 and a multiplier 156. The compensation unit 152 includes a suppressor 41 and an alpha blender 42. The SPC 151 is configured to convert the complex-valued data stream ($G_1(i)$~$G_N$(i)) into N parallel complex-valued data and simultaneously send the N parallel complex-valued data to the suppressor 41. The suppressor 41 includes N multipliers (not shown) that respectively multiply the N mask values ($G_1(i)$~$G_N$(i)) by their respective complex-valued data ($F_{1,1}(i)$~$F_{N,1}(i)$) of the main spectral representation F1($i$) to obtain N product values ($V_1(i)$~$V_N$(i)), i.e., $V_k(i)=G_k(i)\times F_{k,1}(i)$. The alpha blender 42 includes N blending units 42$k$ that operate in parallel, where 1<=k<=N. FIG. 5 is a schematic diagram of a blending unit 42$k$ according to an embodiment of the invention. Each blending unit 42$k$ includes two multipliers 501~502 and one adder 503. Each blending unit 42$k$ is configured to compute complex-valued data: $Z_k(i)=F_{k,1}(i)\times\alpha_k+V_k(i)\times(1-\alpha_k)$, where $\alpha_k$ denotes a blending factor of $k^{th}$ frequency band for adjusting the level (or strength) of noise suppression and acoustic feedback cancellation. Then, the inverse STFT block 154 transforms the complex-valued data ($Z_1(i)$~$Z_N$(i)) in frequency domain into audio data of the current frame i of the audio signal z[n] in time domain. In addition, the multiplier 156 sequentially multiplies each sample in the current frame i of the digital audio signal u[n] by w to obtain audio data in the current frame i of an audio signal p[n], where w denotes a weight for adjusting the ANC level. Afterward, the adder 155 sequentially adds two corresponding samples in the current frames i of the two signals z[n] and p[n] to produce audio data in the current frame i of a sum signal y[n].

In the embodiment of FIG. 1, the audio output circuit 160 is implemented by a traditional monaural output circuit that includes a digital to analog converter (DAC) 161, an amplifier 162 and a loudspeaker 163. In an alternative embodiment, the audio output circuit 160 may be implemented by a traditional stereo output circuit. Since the structure of the traditional stereo output circuit is well known in the art, their descriptions will be omitted herein.

Figure 6A:
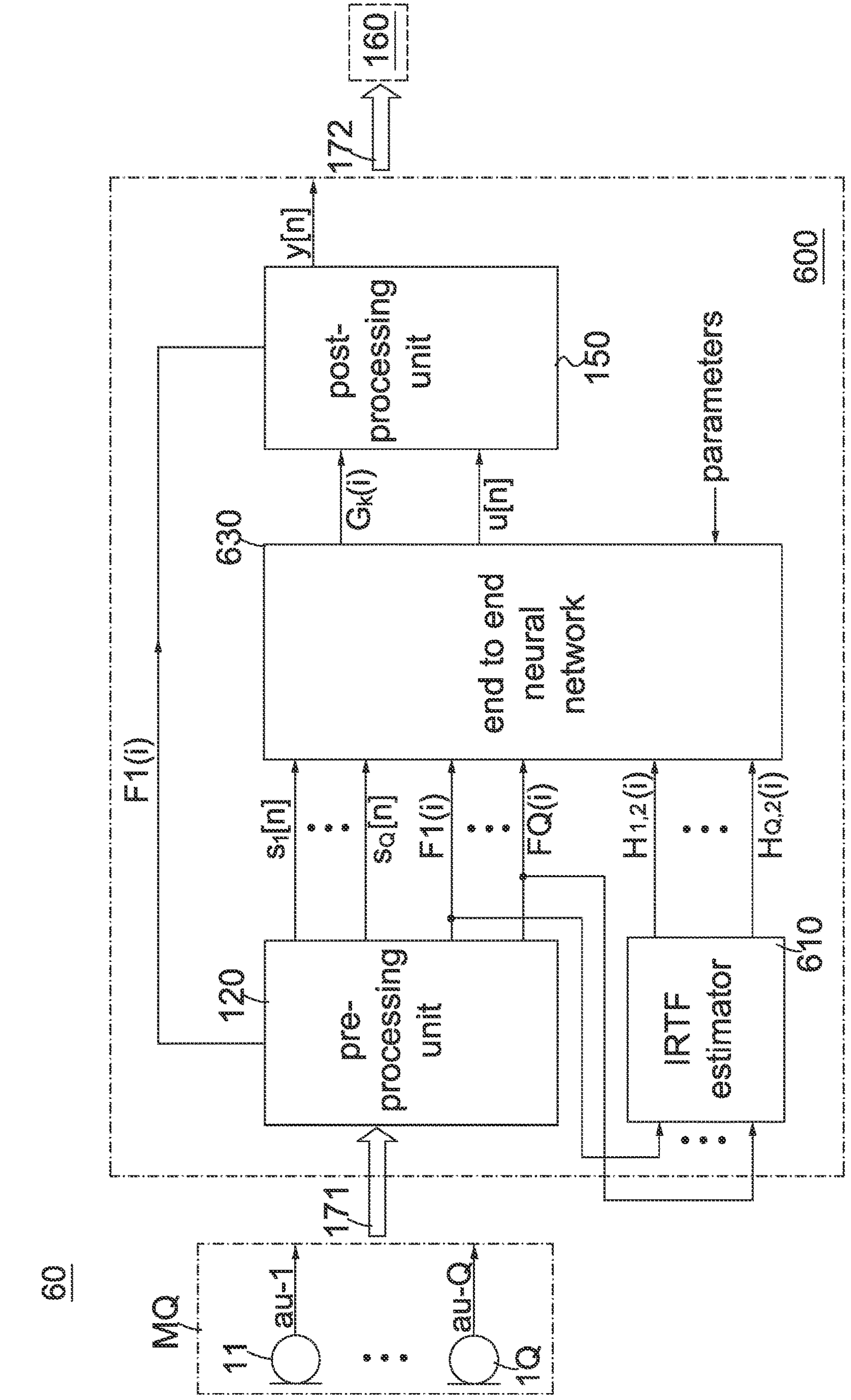
FIG. 6A is a schematic diagram of an audio device according to a second embodiment of the invention.

FIG. 6A is a schematic diagram of an audio device according to a second embodiment of the invention. Referring to FIG. 6A, an audio device 60 of the invention includes the microphone set MQ, an audio module 600, multiple connection links 171~172 and the audio output circuit 160, where Q>=2. In comparison with the audio module 100 in FIG. 1, the audio module 600 of the invention additionally includes an instantaneous relative transfer function (IRTF) estimator 610; besides, the end to end neural network 130 is replaced with an end to end neural network 630.

A RTF represents correlation (or differences in magnitude and in phase) between any two microphones in response to the same sound source. Multiple sound sources can be distinguished by utilizing their RTFs, which describe differences in sound propagation between sound sources and microphones and are generally different for sound sources in different locations. Different sound sources, such as user speech, distractor speech and background noise, bring about different RTFs. Generally, the RTFs are used in sound source location, speech enhancement and beamforming, such as direction of arrival (DOA) and generalized sidelobe canceller (GSC) algorithm.

Figure 6B:
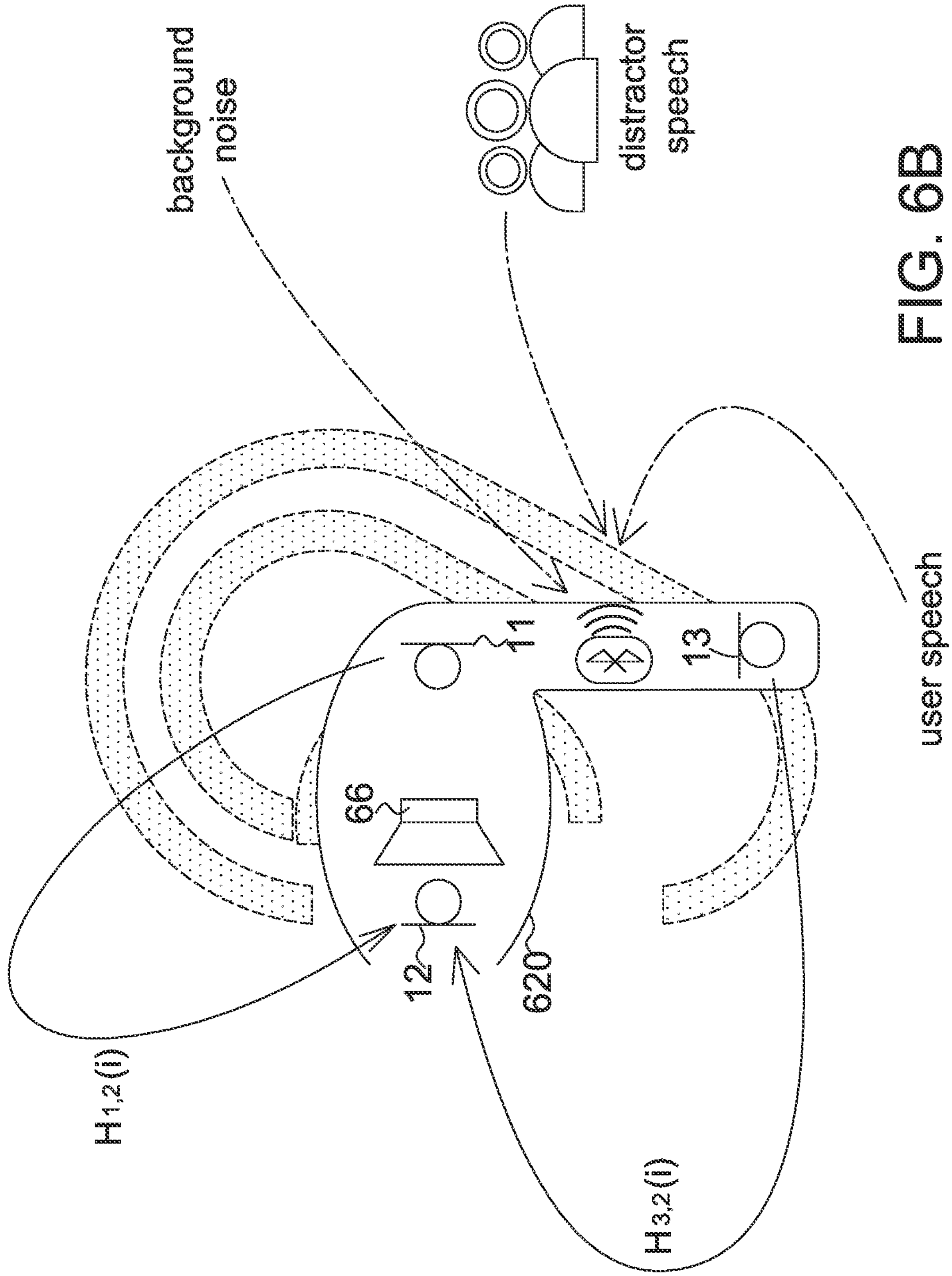
FIG. 6B shows a concept of relative transfer functions (RTFs) given that a feedback microphone 12 is selected as the reference microphone.

Each RTF is defined/computed for each predefined microphone 1$u$ relative to a reference microphone 1$v$, where 1<=u, v<=Q and u≠v. Properly selecting the reference microphone is important as all RTFs are relative to this reference microphone. In a preferred embodiment, a microphone with a higher signal to noise ratio (SNR), such as a feedback microphone 12 of a TWS earbud 620 in FIG. 6B, is selected as the reference microphone. In an alternative preferred embodiment, a microphone with a more complete receiving spectrum range, such as a speech microphone 13 of the TWS earbud 620 in FIG. 6B, is selected as the reference microphone. In practice, the reference microphone is determined/selected according to at least one of the SNRs and the receiving spectrum ranges of all the microphones 11~1Q. The RTF is computed based on audio data in two audio signals while an IRTF is computed based on audio data in each frame of the two audio signals.

$H_{u,v}$(i) denotes an IRTF from the predefined microphone 1$u$ to the reference microphone 1$v$ and is obtained based on audio data in the current frames i of the audio signals $s_u$[n] and $s_v$[n]. Each IRTF ($H_{u,v}$(i)) represents a difference in sound propagation between the predefined microphone 1$u$ and the reference microphone 1$v$ relative to at least one sound source. Each IRTF ($H_{u,v}$(i)) represents a vector including an array of N complex-valued elements: [$H_{1,u,v}$(i), $H_{2,u,v}$(i), . . . , $H_{N,u,v}$(i)], respectively corresponding to N frequency bands for the audio data of the current frames i of the audio signals $s_u$[n] and $s_v$[n]. Each IRTF element ($H_{k,u,v}$(i)) is a complex number that can be expressed in terms of a magnitude and a phase/angle, where 1<=k<=N. Assuming that a microphone 12 is selected as the reference microphone in FIG. 6B, the IRTF estimator 610 respectively receives the current spectral representations F1($i$)~FQ(i) from the pre-processing unit 120 to generate (Q-1) estimated IRTFs ($H_{u,v}$(i)), where v=2 and u=1, 3, . . . , Q. In this scenario, referring to FIG. 6B, when the user speaks, $H_{3,2}(i)$ will be lower in magnitude due to that there is a sound propagation path within the human body; for sound sources other than user speaking, $H_{3,2}(i)$ will be much higher in magnitude compared to $H_{1,2}$. The phases of $H_{3,2}(i)$ and $H_{1,2}(i)$ represent the direct-path angle of the incoming sounds, and can be used in DOA or beamforming.

Figure 6C:
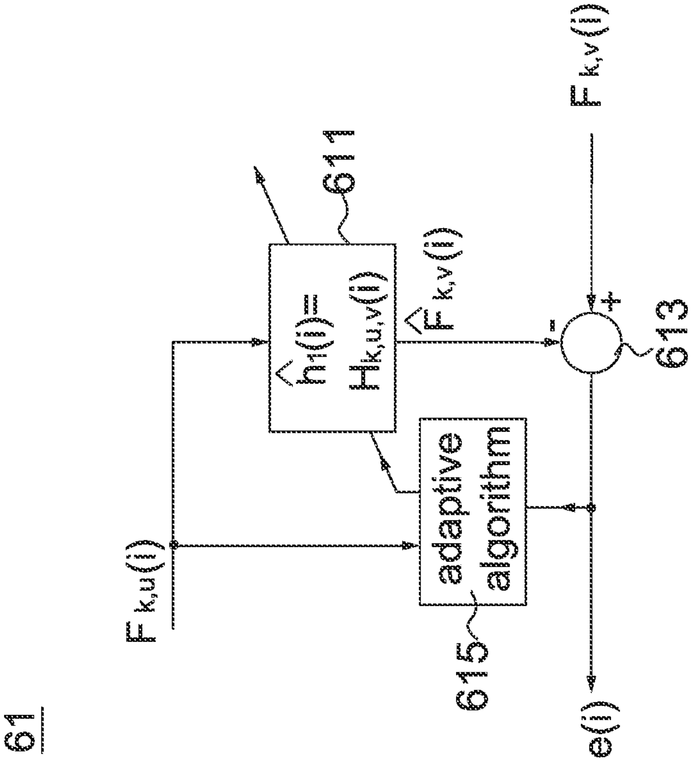
FIG. 6C is a schematic diagram of an instantaneous relative transfer function (IRTF) estimation unit 61 according to an embodiment of the invention.

FIG. 6C is a schematic diagram of an IRTF estimation unit 61 according to an embodiment of the invention. In one embodiment, the IRTF estimator 610 contains a number N×(Q−1) of IRTF estimation units 61, each including an estimated IRTF block 611, a subtractor 613 and a known adaptive algorithm block 615 as shown in FIG. 6C. The number N×(Q−1) of IRTF estimation unit 61 operate in parallel and respectively receive the current spectral representations F1($i$)~FQ(i) (each having N complex-valued samples ($F_{1,j}$(i)~$F_{N,j}$(i), where 1<=j<=Q) from the pre-processing unit 120 to generate (Q−1) estimated IRTFs ($H_{u,v}$(i)), where a microphone 1$v$ is selected as the reference microphone, 1<=u, v<=Q, u≠v, and each estimated RTF ($H_{u,v}$(i)) contains N IRTF elements ($H_{1,u,v}$(i)~$H_{N,u,v}$(i)). In an alternative embodiment, the IRTF estimator 610 includes a single IRTF estimation unit 61 that operates on a frequency-band-by-frequency-band basis and a microphone-by-microphone basis. That is to say, the single IRTF estimation unit 61 receives two complex-valued samples ($F_{k,u}$(i) and $F_{k,v}$(i) for $k^{th}$ frequency band to generate a IRTF element ($H_{k,u,v}$(i)) for a single estimated IRTF ($H_{u,v}$(i)), and then computes the other IRTF elements for other frequency bands of the single estimated IRTF ($H_{u,v}$(i)) on a frequency-band-by-frequency-band basis, where 1<=k<=N and u #v. Afterward, in the same manner, the single IRTF estimation unit 61 computes the IRTF elements for the other estimated IRTFs ($H_{u,v}$(i)) on a microphone-by-microphone basis. In this scenario, the single IRTF estimation unit 61 needs to operate N×(Q−1) times to obtain all IRTF elements for (Q−1) estimated IRTFs ($H_{u,v}$(i)). In FIG. 6C, the estimated IRTF block 611 receives the input sample $F_{k,u}$(i) and produces an estimated sample $\widehat{F_{k,v}}(i)$ for $k^{th}$ frequency band based on a previous estimated IRTF ($\widehat{h_1}(i)$=$H_{k,u,v}$(i)) from the adaptive algorithm block 615, where $\widehat{F_{k,v}}(i)$=$H_{k,u,v}$(i)×$F_{k,u}$(i). Then, the known adaptive algorithm block 615 updates the complex value of the current estimated IRTF ($\widehat{h_1}(i)$=$H_{k,u,v}$(i)) for $k^{th}$ frequency band according to the input sample $F_{k,u}$(i) and the error signal e(i) so as to minimize the error signal e(i) between the input sample $F_{k,v}$(i) and an estimated sample $\widehat{F_{k,v}}(i)$ for a given environment. In one embodiment, the known adaptive algorithm block 615 is implemented by a least mean square (LMS) algorithm to produce the current complex value of the current estimated IRTF ($\widehat{h_1}(i)$=$H_{k,u,v}$(i)). However, the LMS algorithm is provided by example and not limitation of the invention.

Figure 6D:
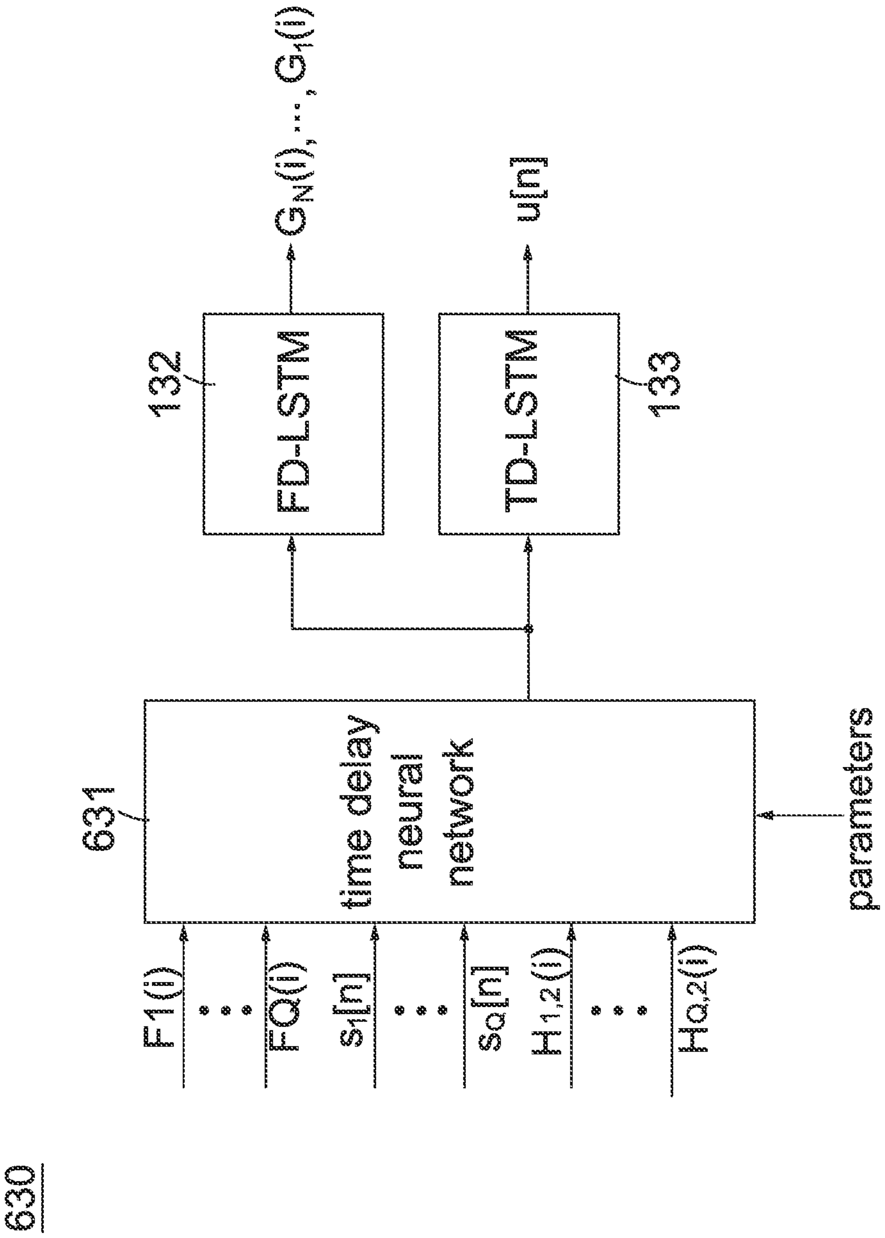
FIG. 6D is a schematic diagram of an end-to-end neural network 630 according to another embodiment of the invention.

In comparison with the neural network 130, the end to end neural network 630 (or the TDNN 631) additionally receives (Q−1) estimated IRTFs ($H_{u,v}$(i)) and one more input parameter as shown in FIG. 6D. For the distractor suppression function, the one more input parameter for the end-to-end neural network 630 includes, but is not limited to, a level or strength of suppression. According to all the input parameters, the end-to-end neural network 630 receives the Q current spectral representations F1($i$)~FQ(i), the (Q−1) estimated IRTFs ($H_{u,v}$(i)) and audio data of the current frames i of Q time-domain input streams $s_1$[n]~$s_Q$[n] in parallel, performs distractor suppression (in addition to all the audio signal processing operations that are performed by the neural network 130) and generates one frequency-domain compensation mask stream (including N mask values $G_1(i)$~$G_N(i)$) corresponding to N frequency bands and audio data of the current frame i of one time-domain output sample stream u[n].

For the distractor suppression function, the input data for a fifth set of labeled training examples are constructed artificially by adding various distractor speech data to clean speech data, and the ground truth (or labeled output) for each example in the fifth set of labeled training examples requires a frequency-domain compensation mask stream (including N mask values $G_1(i)$~$G_N(i)$) for corresponding clean speech data. For the distractor speech data, various distractor speech data from various directions, different distances and different numbers of people are collected. During the process of artificially constructing the input data, the distractor speech data is mixed at different levels with the clean speech data to produce a wide range of SNRs for the fifth sets of labeled training examples. The end-to-end neural network 630 is configured to use the above-mentioned five sets (i.e., from the first to the fifth sets) of labeled training examples to learn or estimate the function $f$ (i.e., the model 630), and then to update model weights using the backpropagation algorithm in combination with cost function. Besides, in the training phase, the TDNN 631 and the FD-LSTM network 132 are jointly trained with the first, the second, the third and the fifth sets of labeled training examples, each labeled as a corresponding frequency-domain compensation mask stream (including N mask values $G_1(i)$~$G_N(i)$); the TDNN 631 and the TD-LSTM network 133 are jointly trained with the fourth set of labeled training examples, each labeled as N corresponding time-domain audio sample values. When trained, the TDNN 631 and the FD-LSTM network 132 can process new unlabeled audio data, for example audio feature vectors, to generate N corresponding frequency-domain mask values $G_1(i)$~$G_N(i)$ for the N frequency bands while the TDNN 631 and the TD-LSTM network 133 can process new unlabeled audio data, for example audio feature vectors, to generate N corresponding time-domain audio sample values for the current frame i of the signal u[n].

Figure 7A:
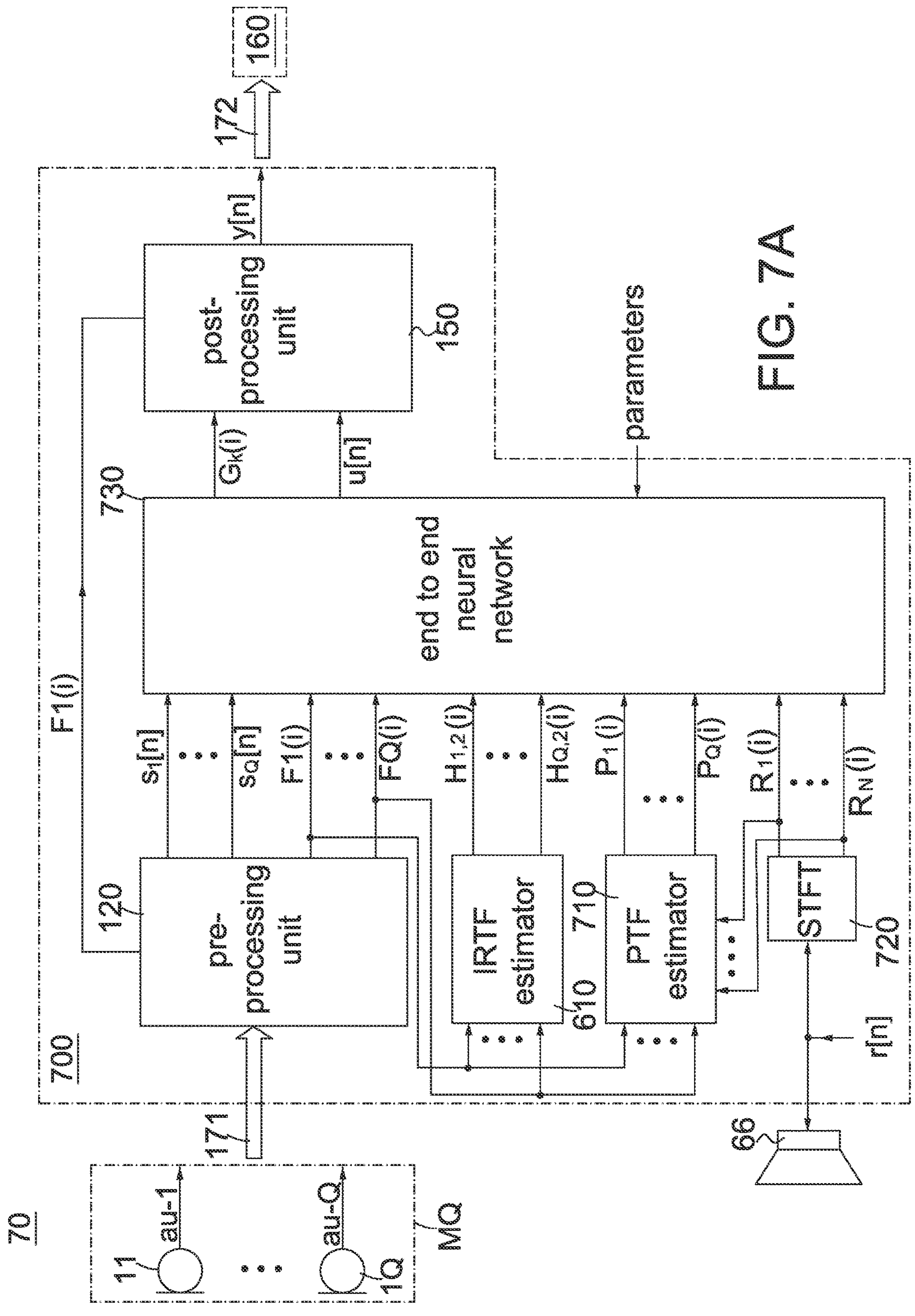
FIG. 7A is a schematic diagram of an audio device according to a third embodiment of the invention.

FIG. 7A is a schematic diagram of an audio device according to a third embodiment of the invention. Referring to FIG. 7A, an audio device 70 of the invention includes the microphone set MQ, a loudspeaker 66, an audio module 700 and the audio output circuit 160, where Q>=2. In comparison with the audio module 600 in FIG. 6A, the audio module 700 of the invention additionally includes a playback transfer function (PTF) estimator 710 and a STFT block 720, and the end to end neural network 630 is replaced with an end to end neural network 730. The STFT block 720 performs the same operations as the STFT block 122 in FIG. 2 does. The STFT block 720 divides a playback audio signal r[n] (played by a loudspeaker at a source device, such as a loudspeaker 66 at a TWS earbud 620 in FIG. 7B) into a plurality of frames and computes the FFT of audio data in the current frame i of the playback audio signal r[n] to generate a current spectral representation R(i) having N complex-valued samples ($R_1(i)$~$R_N(i)$) with a frequency resolution of fs/N(=1/Td).

Figure 7B:
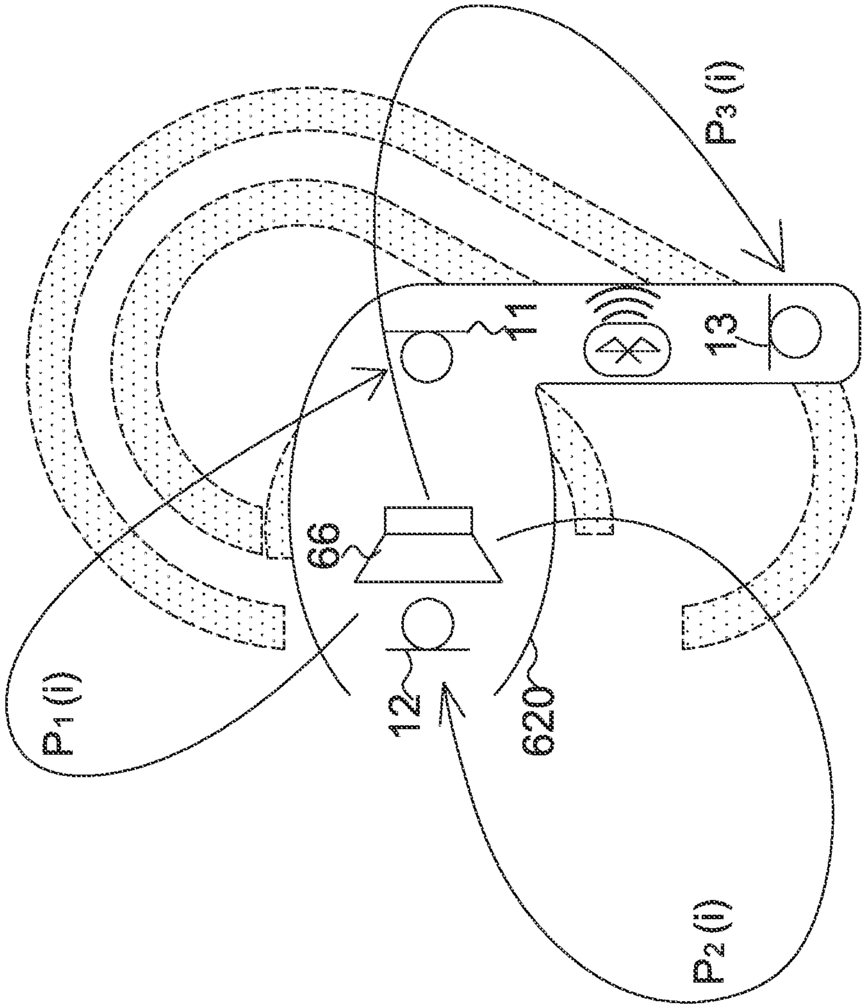
FIG. 7B shows a concept of playback transfer functions (PTFs) given that a loudspeaker 66 is playing a playback audio signal r[n].

The playback audio signal r[n] played by a loudspeaker 66 can be modeled by PTFs relative to each of the microphones 11~1Q at the source device, i.e., at the TWS earbud 620 in FIG. 7B. For example, $P_j(i)$ is a playback transfer function of audio data in the current frame i of the playback audio signal r[n] relative to a microphone 1*j*, where 1<=j<=Q. Each PTF ($P_j(i)$) represents a vector including an array of N complex-valued elements: [$P_{1,j}(i)$, $P_{2,j}(i)$, $P_{N,j}(i)$], respectively corresponding to N frequency bands for the audio data of the current frame i of the playback audio signal r[n]. Each PTF element $P_{k,j}(i)$ is a complex number that can be expressed in terms of a magnitude and a phase/angle, where 1<=k<=N. In general, the higher the magnitude of a PTF ($P_j(i)$), the more the sound leakage from the loudspeaker 66 into the microphone 1*j* at the TWS earbud 620. For an ideal earbud configuration, the lower the magnitude of a PTF, the better the performance of the earbud.

Assuming that a microphone 12 is selected as the reference microphone in FIG. 7B, the IRTF estimator 610 generates (Q−1) estimated IRTFs ($H_{u,v}(i)$), where v=2 and u=1, 3, . . . , Q. The end-to-end neural network 730 is further configured to perform acoustic echo cancellation (AEC) based on Q estimated PTFs, the current spectral representation R(i), (Q−1) estimated IRTFs ($H_{u,v}(i)$), the Q current spectral representations F1(*i*)~FQ(i) and the audio data of the current frames i of time-domain digital audio signals ($s_1[n]$~$s_Q[n]$) to mitigate the microphone signal corruption caused by the playback audio signal r[n]. Therefore, the net complex value for $k^{th}$ frequency band is obtained by: $B_{k,j}(i)=F_{k,j}(i)-R_k(i)\times P_{k,j}(i)$, where $F_{k,j}(i)$ denotes a complex-valued sample in $k^{th}$ frequency band of the current spectral representation Fj(i) corresponding to the audio data of the current frame i of the audio signal $s_j[n]$, $P_{k,j}(i)$ is a playback transfer function in $k^{th}$ frequency band for the audio data in the current frame i of the playback audio signal r[n] relative to the microphone 1*j* and $R_k(i)$ denotes a complex-valued sample in $k^{th}$ frequency band of the current spectral representation R(i) corresponding to the audio data of the current frame i of the playback audio signal r[n].

Figure 7C:
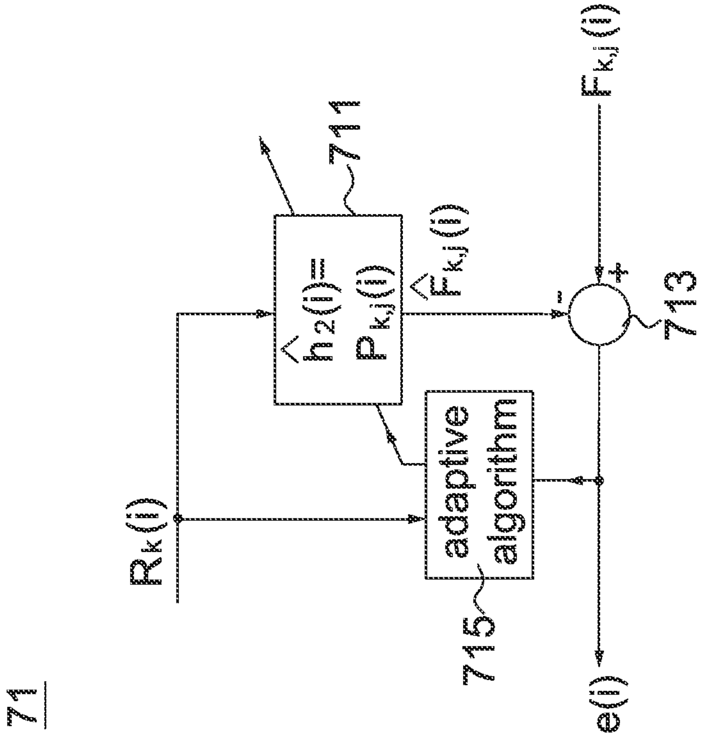
FIG. 7C is a schematic diagram of a PTF estimation unit 71 according to an embodiment of the invention.

FIG. 7C is a schematic diagram of a PTF estimation unit 71 according to an embodiment of the invention. In one embodiment, the PTF estimator 710 contains a number N×Q of PTF estimation units 71, each including an estimated PTF block 711, a subtractor 713 and a known adaptive algorithm block 715 as shown in FIG. 7C. The number N×Q of PTF estimation units 71 operate in parallel and respectively receive the current spectral representations F1(*i*)~FQ(i) from the pre-processing unit 120 and the current spectral representation R(i) from the STFT block 720 to generate Q estimated PTFs ($P_j(i)$), where each estimated PTF ($P_j(i)$) contains a number N of PTF elements ($P_{1,j}(i)$~$P_{N,j}(i)$). In an alternative embodiment, the PTF estimator 710 includes a single PTF estimation unit 71 that operate on a frequency-band-by-frequency-band basis and a microphone-by-microphone basis. That is to say, the single PTF estimation unit 71 receives two complex-valued samples ($F_{k,j}(i)$ and $R_k(i)$) for $k^{th}$ frequency band on a frequency-band-by-frequency-band basis to generate a PTF element ($P_{k,j}(i)$) for a single estimated PTF ($P_j(i)$) and then computes the PTF elements for the other frequency bands of the single estimated PTF ($P_j(i)$) on a frequency-band-by-frequency-band basis. Afterward, in the same manner, the single PTF estimation unit 71 computes the PTF elements for the other estimated PTFs ($P_j(i)$) on a microphone-by-microphone basis. In this scenario, the single PTF estimation unit 71 needs to operate N×Q times to obtain all PTF elements for Q estimated PTFs ($P_j(i)$). In FIG. 7C, the estimated PTF block 711 receives the sample $R_k(i)$ and produces an estimated sample $\hat{F}_{k,j}(i)$ for $k^{th}$ frequency band based on a previous estimated PTF ( $\widehat{h_2}(i)=P_{k,j}(i)$) from the adaptive algorithm block 715, so that $\hat{F}_{k,j}(i)=P_{k,j}(i)\times R_k(i)$. Then, the adaptive algorithm block 715 updates the complex value of the current estimated PTF (i.e., $\widehat{h_2}(i)=$ $P_{k,j}$(i)) for $k^{th}$ frequency band according to the input sample $R_k$(i) and the error signal e(i) so as to minimize the error signal e(i) between the sample $F_{k,j}$(i) and an estimated sample $\hat{F}_{k,j}$(i) for a given environment. In one embodiment, the known adaptive algorithm block 715 is implemented by the LMS algorithm to produce the complex value of the current estimated PTF block 711. However, the LMS algorithm is provided by example and not limitation of the invention.

Figure 7D:
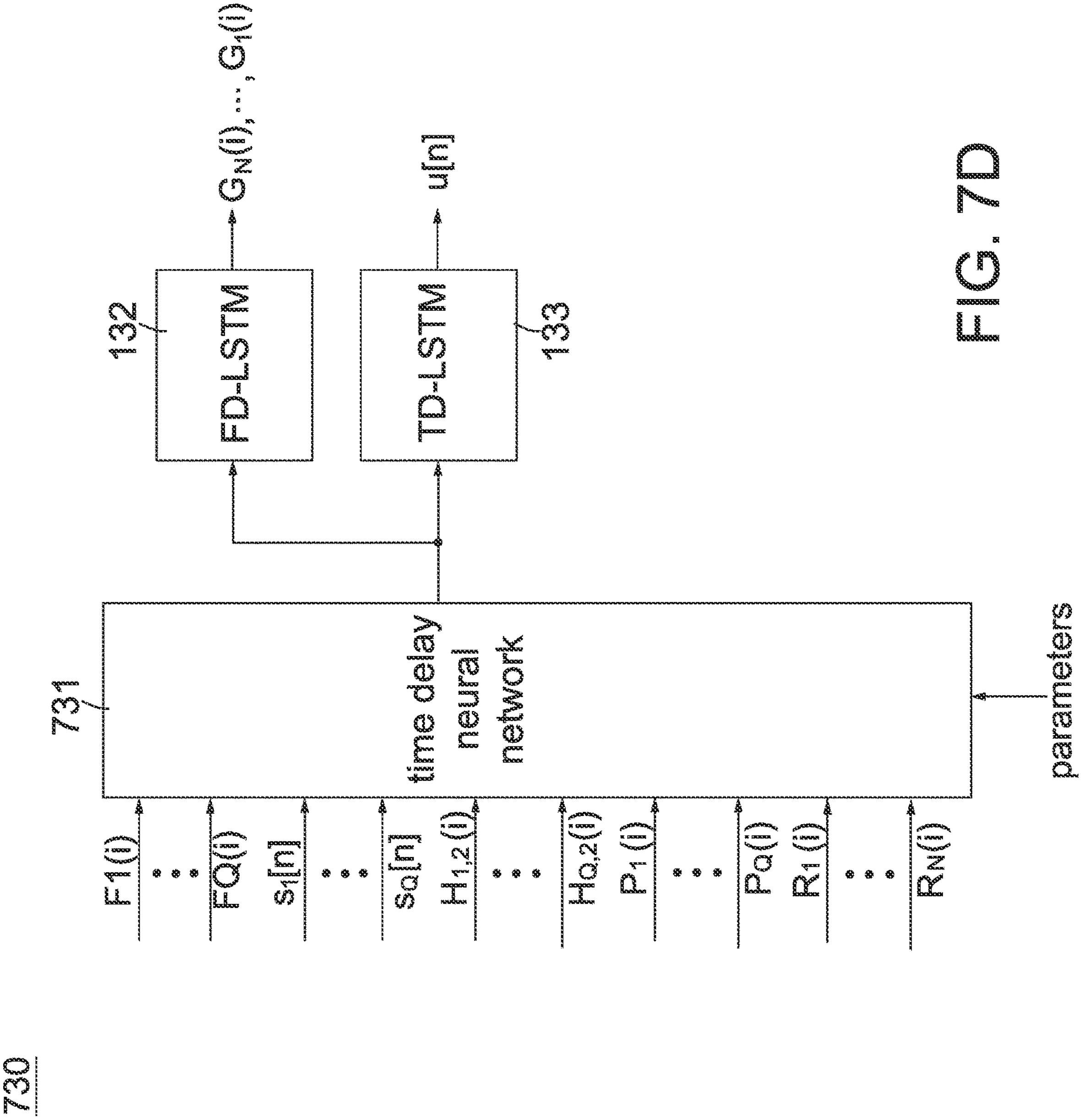
FIG. 7D is a schematic diagram of an end-to-end neural network 730 according to another embodiment of the invention.

In comparison with the neural network 630, the end to end neural network 730 (or the TDNN 731) additionally receives a number Q of PTFs ($P_1(i)$~$P_Q$(i)) and one more input parameter as shown in FIG. 7D. For the AEC function, the one more input parameter for the end-to-end neural network 730 includes, but is not limited to, a level or strength of suppression. According to the input parameters, the end-to-end neural network 730 receives the Q current spectral representations F1(*i*)~FQ(i), the (Q−1) RTFs ($H_{1,2}(i)$~$H_{Q,2}$ (*i*)), the number Q of estimated PTFs ($P_1(i)$~$P_Q$(i)), N complex-valued samples ($R_1(i)$~$R_N$(i)) and audio data of the current frames i of Q time-domain input streams $s_1$[n]~$s_Q$[n] in parallel, performs AEC function (in addition to the audio signal processing operations that are performed by the neural network 630) and generates one frequency-domain compensation mask stream (including N mask values $G_1(i)$ ~$G_N$(i)) corresponding to N frequency bands and audio data of the current frame i of one time-domain output sample stream u[n].

For the AEC function, the input data for a sixth set of labeled training examples are constructed artificially by adding various playback audio data to clean speech data, and the ground truth (or labeled output) for each example in the sixth set of labeled training examples requires a frequency-domain compensation mask stream (including N mask values $G_1(i)$~$G_N$(i)) for corresponding clean speech data. For the playback audio data, various playback audio data played by different loudspeakers at the source devices or the sink device at different locations are collected. During the process of artificially constructing the input data, the playback audio data is mixed at different levels with the clean speech data to produce a wide range of SNRs for the sixth sets of labeled training examples. The end-to-end neural network 730 is configured to use the above-mentioned six sets (from the first to the sixth sets) of labeled training examples to learn or estimate the function *ƒ* (i.e., the model 730), and then to update model weights using the backpropagation algorithm in combination with cost function. Besides, in the training phase, the TDNN 731 and the FD-LSTM network 132 are jointly trained with the first, the second, the third, the fifth and the sixth sets of labeled training examples, each labeled as a corresponding frequency-domain compensation mask stream (including N mask values $G_1(i)$~$G_N$(i)); the TDNN 731 and the TD-LSTM network 133 are jointly trained with the fourth set of labeled training examples, each labeled as N corresponding time-domain audio sample values. When trained, the TDNN 731 and the FD-LSTM network 132 can process new unlabeled audio data, for example audio feature vectors, to generate N corresponding frequency-domain mask values $G_1(i)$~$G_N$(i) for the N frequency bands while the TDNN 731 and the TD-LSTM network 133 can process new unlabeled audio data, for example audio feature vectors, to generate N corresponding time-domain audio sample values for the current frame i of the signal u[n].

Each of the pre-processing unit 120, the IRTF estimator 610, the PTF estimator 710, the STFT 720, the end-to-end neural network 130/630/730 and the post-processing unit 150 may be implemented by software, hardware, firmware, or a combination thereof. In one embodiment, the pre-processing unit 120, the IRTF estimator 610, the PTF estimator 710, the STFT 720, the end-to-end neural network 130/630/730 and the post-processing unit 150 are implemented by at least one first processor and at least one first storage media (not shown). The at least one first storage media stores instructions/program codes operable to be executed by the at least one first processor to cause the at least one first processor to function as: the pre-processing unit 120, the IRTF estimator 610, the PTF estimator 710, the STFT 720, the end-to-end neural network 130/630/730 and the post-processing unit 150. In an alternative embodiment, the IRTF estimator 610, the PTF estimator 710, and the end-to-end neural network 20) 130/630/730 are implemented by at least one second processor and at least one second storage media (not shown). The at least one second storage media stores instructions/program codes operable to be executed by the at least one second processor to cause the at least one second processor to function as: the IRTF estimator 610, the PTF estimator 710 and the end-to-end neural network 130/630/730.

FIGS. 8A-8D show examples of different connection topology of audio devices 800A~800D of the invention. In FIGS. 8A-8D, each of audio modules 81~85 can be implemented by one of the audio modules 100/600/700. Each Bluetooth-enabled mobile phone 870~890 functions as the sink device while each Bluetooth-enabled TWS earbud 810~850 with multiple microphones and one loudspeaker function as the source device. Each Bluetooth-enabled TWS earbud 810~850 delivers its audio data (y[n] or $s_j$[n]) to either the other Bluetooth-enabled TWS earbud or the mobile phone 870~890 over a Bluetooth communication link. For purpose of clarity and ease of description, the following embodiments are described with assumption that the audio modules 81~85 are implemented by the audio module 700, the audio output circuit 160 is implemented by a stereo output circuit, and there are three microphones and one loudspeaker (not shown) placed at each TWS earbud 810~850.

Figure 8A:
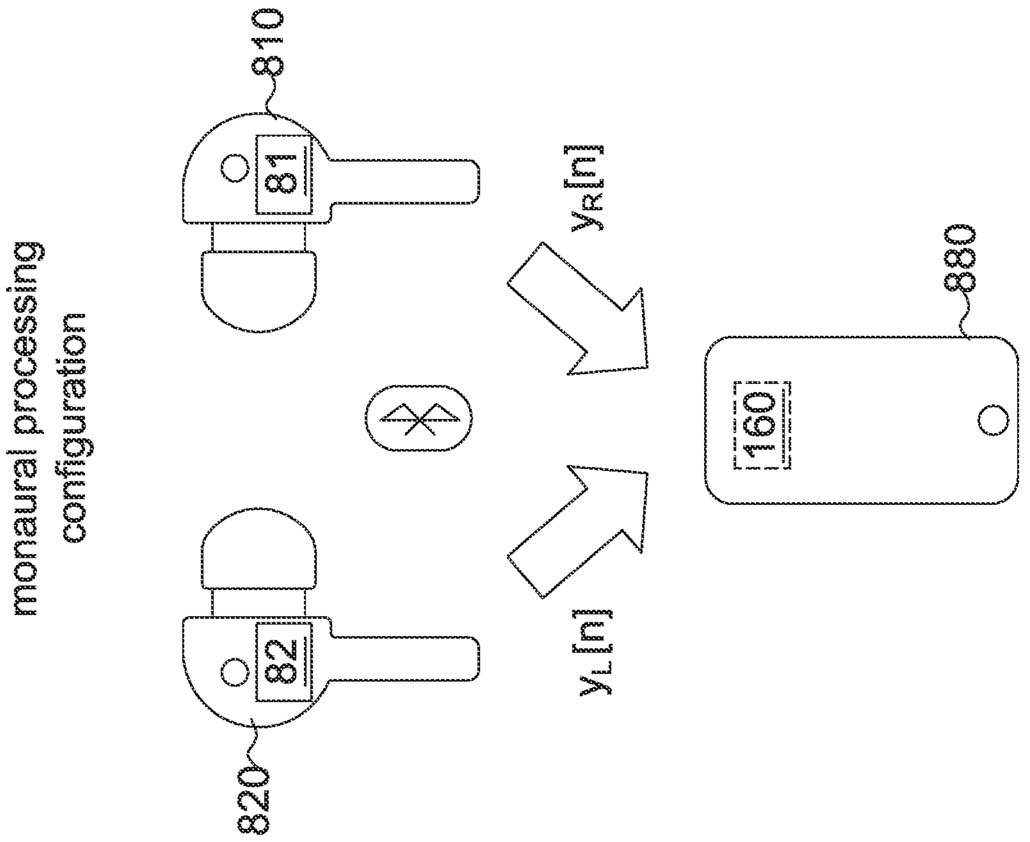
FIG. 8A is a schematic diagram of an audio device 800A with monaural processing configuration according to an embodiment of the invention.

FIG. 8A is a schematic diagram of an audio device 800A with monaural processing configuration according to an embodiment of the invention. Referring to FIG. 8A, an audio device 800A includes a first audio module 81, a second audio module 82, six microphones 11~16, two loudspeakers s1-s2 and a stereo output circuit 160 (embedded in a mobile phone 880). The first audio module 81, the loudspeaker s1 and three microphones 11~13 (not shown) are placed at a TWS earbud 810 while the second audio module 82, the loudspeaker $s_2$ and three microphones 14~16 (not shown) are placed at a TWS earbud 820. It is assumed that the microphones 12 and 16 are respectively selected as the reference microphones for the first and the second audio modules 81 and 82.

Each of the audio modules 81/82 receives three audio signals from three microphones and a playback audio signal for one loudspeaker at the same TWS earbud, performs ANC function and the advanced audio signal processing including distractor suppression and AEC, and generates a time-domain digital audio signal $y_R[n]/y_L[n]$. Next, the TWS earbuds 810 and 820 respectively deliver their outputs ($y_R$[n] and $y_L$[n]) to the mobile phone 880 over two separate Bluetooth communication links. Finally, after receiving the two digital audio signals $y_R$[n] and $y_L$[n], the mobile phone 880 may deliver them to the stereo output circuit 160 for audio play, store them in a storage media, or deliver them to another sink device for audio communication via another communication link, such as WiFi.

Figure 8B:
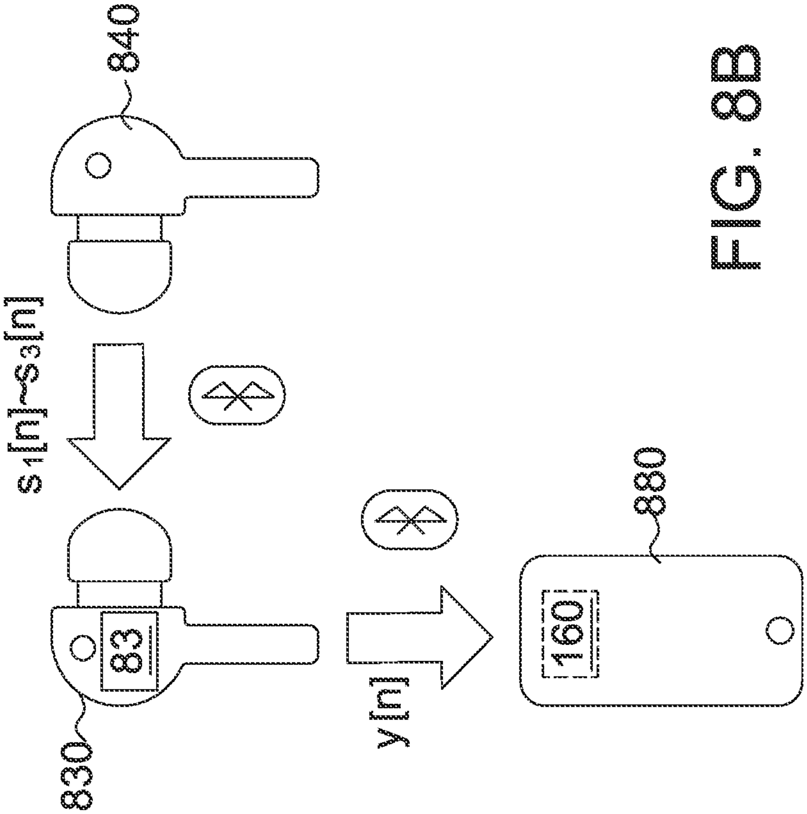
FIG. 8B is a schematic diagram of an audio device 800B with binaural processing configuration according to an embodiment of the invention.

FIG. 8B is a schematic diagram of an audio device 800B with binaural processing configuration according to an embodiment of the invention. Referring to FIG. 8B, an audio device 800B includes six microphones 11~16, two loudspeakers s1-s2, an audio module 83 and a 20) stereo output circuit 160 (embedded in the mobile phone 880). The loudspeaker s1 and three microphones 11~13 (not shown) are placed at a TWS earbud 840 while the audio module 83, the loudspeaker s2 and three microphones 14~16 (not shown) are placed at a TWS earbud 830. Please note that there is no audio module in the TWS right earbud 840 and the audio module 83 receives six audio input signals $s_1[n]$ ~$s_6[n]$ and one playback audio signal r[n] (to be played by the loudspeaker s2). It is assumed that the microphone 12 is selected as the reference microphone for the audio module 83.

At first, the TWS right earbud 840 delivers three audio signals $s_1[n]$~$s_3[n]$ from three microphones 11~13 to the TWS left earbud 830 over a Bluetooth communication link. Then, the TWS left earbud 830 feeds the playback audio signal r[n], three audio signals $s_4[n]$~$s_6[n]$ from three microphones 14~16 and the three audio signals $s_1[n]$~$s_3[n]$ to the audio module 83. The audio module 83 receives the six audio signals $s_1[n]$~$s_6[n]$ and the playback audio signal r[n], performs ANC function and the advanced audio signal processing including distractor suppression and AEC, and generates a time-domain digital audio signal y[n]. Next, the TWS left earbud 830 delivers the digital audio signal y[n] to the mobile phone 880 over another Bluetooth communication link. Finally, after receiving the digital audio signal y[n], the mobile phone 880 may deliver them to the stereo output circuit 160 for audio play, store them in a storage media, or deliver them to another sink device for audio communication via another communication link, such as WiFi.

Figure 8C:
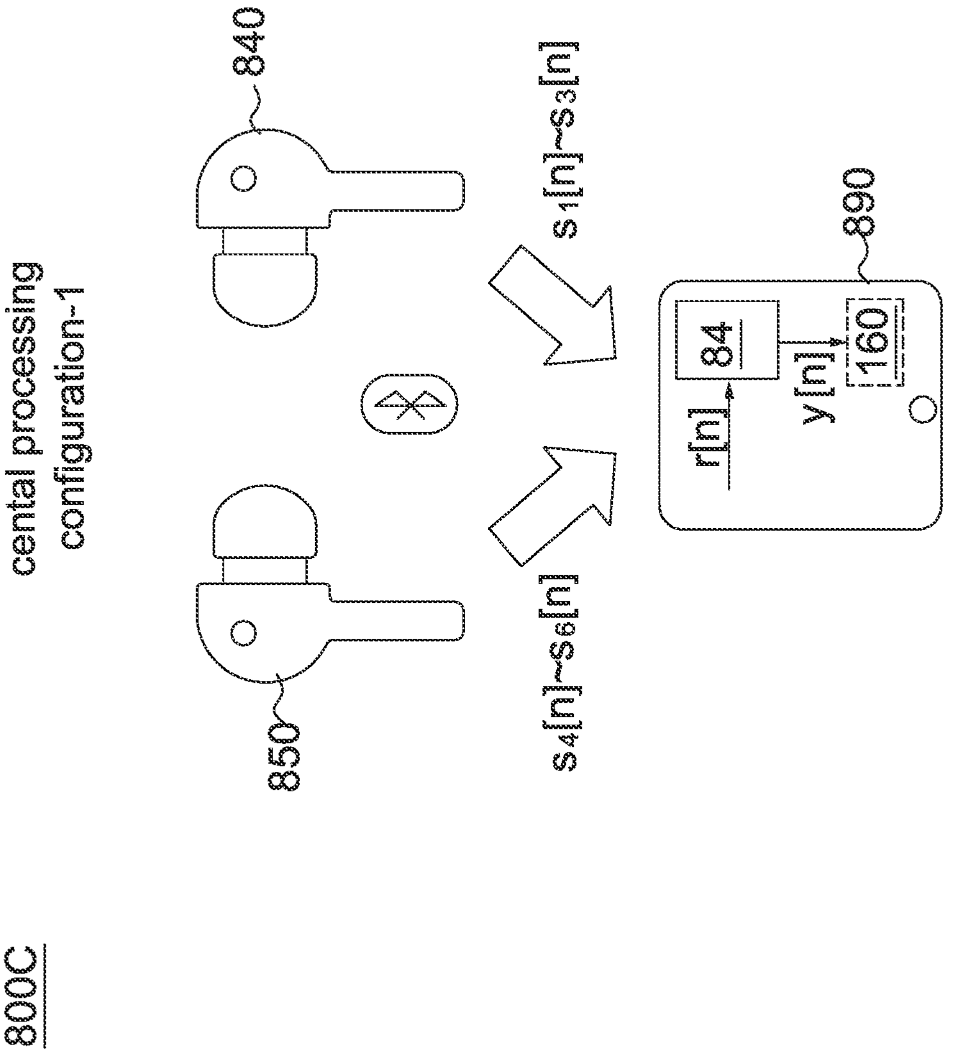
FIG. 8C is a schematic diagram of an audio device 800C with central processing configuration-1 according to an embodiment of the invention.

FIG. 8C is a schematic diagram of an audio device 800C with central processing configuration-1 according to an embodiment of the invention. Referring to FIG. 8C, an audio device 800C includes six microphones 11~16, an audio module 84 (embedded in the mobile phone 890), two loudspeakers s1-s2 and a stereo output circuit 160 (embedded in the mobile phone 890). The loudspeaker s1 and three microphones 11~13 (not shown) are placed at a TWS earbud 840 while the loudspeaker s2 and three microphones 14~16 (not shown) are placed at a TWS earbud 850. The audio module 84 Please note that there is no audio module in the TWS earbuds 840 and 850 and the audio module 84 receives six audio input signals and a playback audio signal r[n]. It is assumed that the microphone 12 is selected as the reference microphone for the audio module 84, and that either a monophonic audio signal or a stereophonic audio signal (includes a left-channel audio signal and a right-channel audio signal) may be sent by the mobile phone 890 to the TWS earbuds 840 and 850 over two separate Bluetooth communication links and played by the two loudspeakers s1-s2. Here, the playback audio signal r[n] is one of the monophonic audio signal, the stereophonic audio signal, the left-channel audio signal and the right-channel audio signal.

At first, the TWS earbuds 840 and 850 respectively delivers six audio signals $s_1[n]$~$s_6[n]$ from six microphones 11~16 to the mobile phone 890 over two separate Bluetooth communication links. Then, the mobile phone 890 feeds the six audio signals $s_1[n]$~$s_6[n]$ to the audio module 84. The audio module 84 receives the six audio signals $s_1[n]$~$s_6[n]$ and the playback audio signal r[n], performs ANC function and the advanced audio signal processing including distractor suppression and AEC, and generates a time-domain digital audio signal y[n]. Finally, the audio module 84 may deliver the signal y[n] to the stereo output circuit 160 for audio play. If not, the mobile phone 890 may store it in a storage media or deliver it to another sink device for audio communication via another communication link, such as WiFi.

Figure 8D:
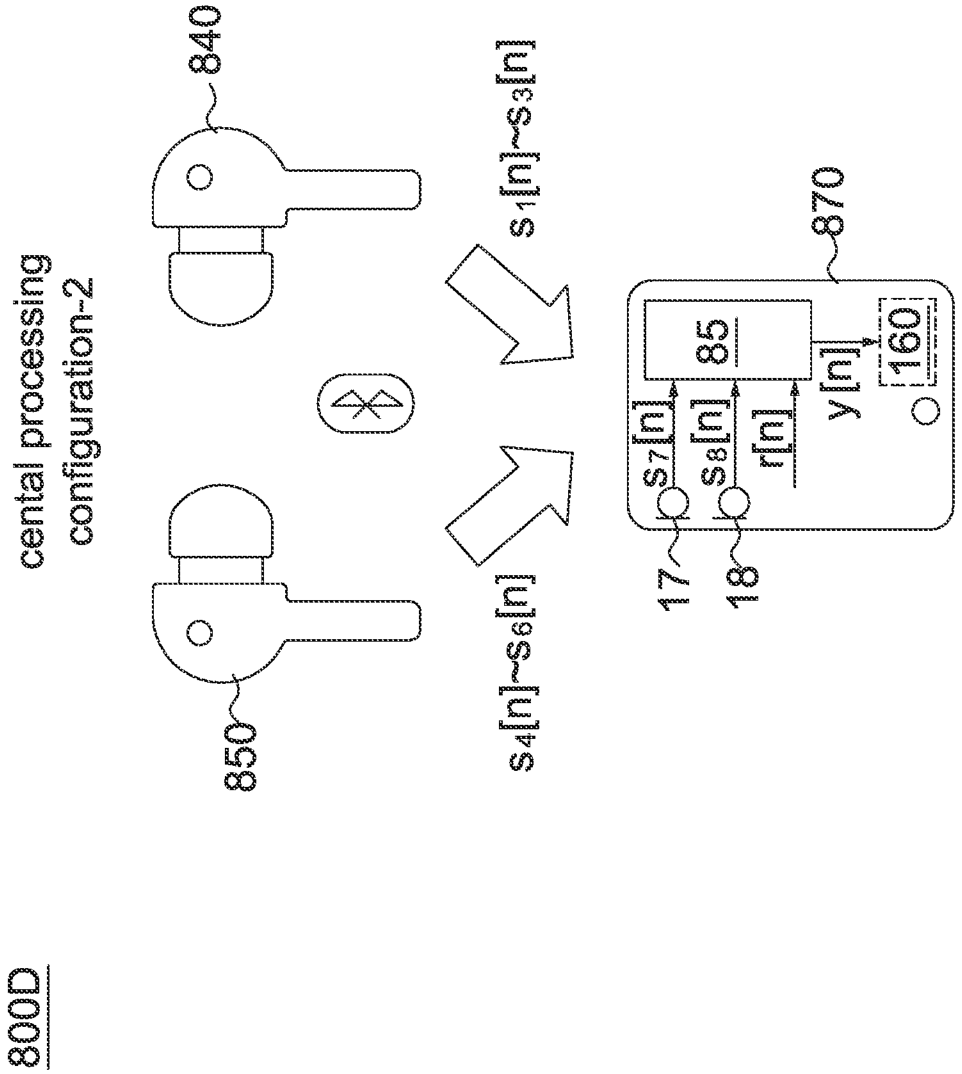
FIG. 8D is a schematic diagram of an audio device 800D with central processing configuration-2 according to an embodiment of the invention.

FIG. 8D is a schematic diagram of an audio device 800D with central processing configuration-2 according to an embodiment of the invention. Referring to FIG. 8D, an audio device 800D includes six microphones 11~16, two loudspeakers s1-s2, m microphones, an audio module 85 and a stereo output circuit 160, where m>=1. Here, the m microphones, the audio module 85 and the stereo output circuit 160 are embedded in the mobile phone 870. The audio devices 800C and 800D have similar functions. The difference between the audio devices 800C and 800D is that m additional audio signals from the m microphones placed at the mobile phone 870 are also sent to the audio module 85 in the audio device 800D. Assuming m=2, as shown in FIG. 8D, the audio module 85 receives eight audio signals $s_1[n]$ ~$s_8[n]$ from the microphones 11~18 and the playback audio signal r[n], performs ANC function and the advanced audio signal processing including distractor suppression and AEC, and generates a time-domain digital audio signal y[n]. Finally, the audio module 85 may directly deliver the digital audio signal y[n] to the stereo output circuit 160 for play audio. If not, the mobile phone 870 may store it in a storage media or deliver it to another sink device for audio communication via another communication link, such as WiFi.

In brief, the audio devices 800A~D including one of the audio modules 600 and 700 of the invention can suppress the distractor speech 230 as shown in FIG. 1A. In particular, with the audio module 600/700, multiple microphone signals from one or more the source devices 840 and 850 and m microphone signals from the sink device 870, the audio device 800D can suppress the distractor speech significantly, where m>=1.

Figure 9:
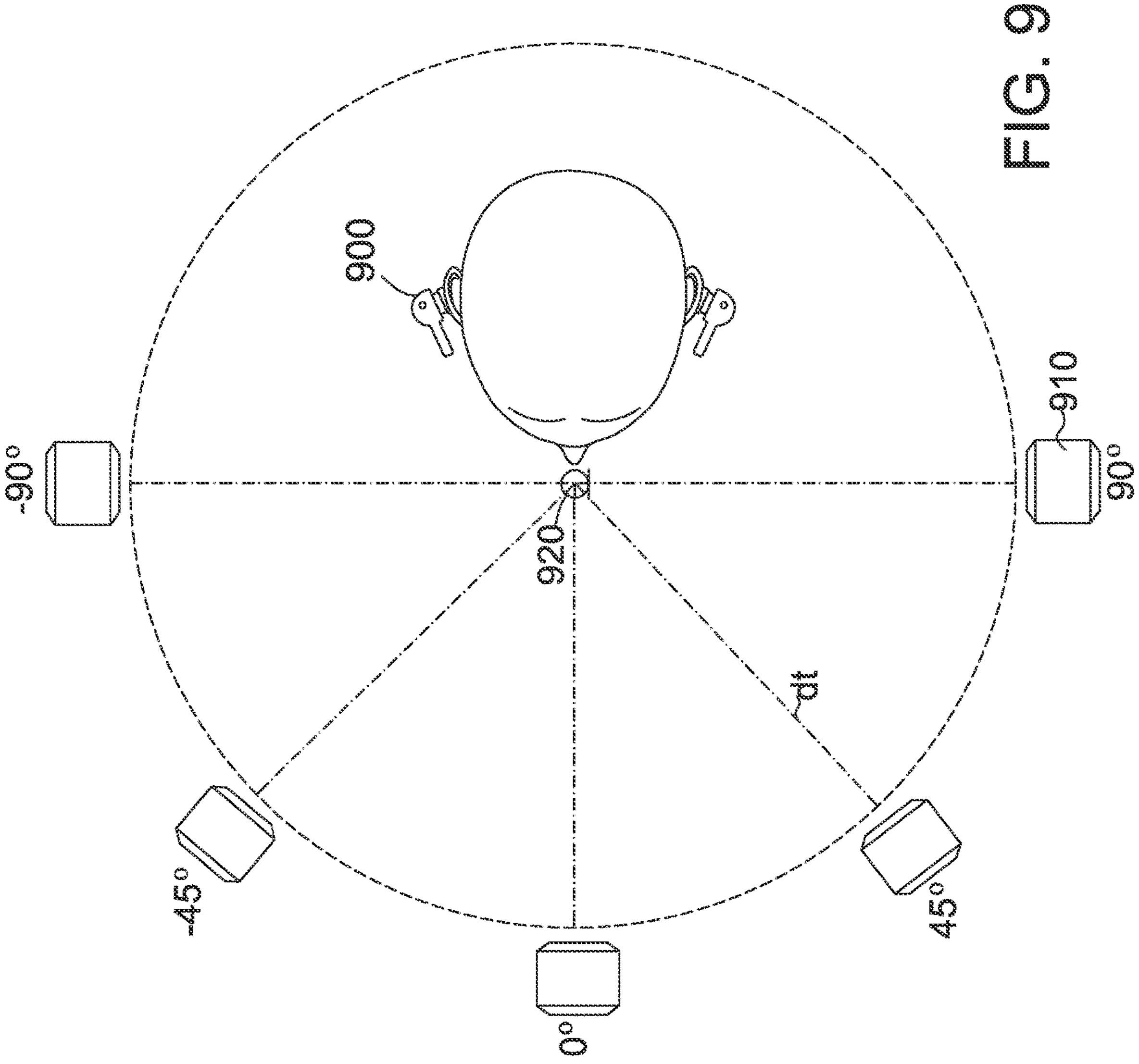
FIG. 9 shows a test specification for a headset 900 with the audio module 600/700 that meets the Microsoft Teams open office requirements for distractor attenuation.

FIG. 9 shows a test specification for a headset 900 including the audio module 600/700 of the invention that meets the Microsoft Teams open office standards for distractor attenuation. The performance of the audio modules 600 and 700 of the invention has been tested and verified according to the test specification in FIG. 9. The purpose of this test is to verify the ability of the audio module 600/700 to suppress nearby talkers' speech, i.e., the distractor speech. In the example of FIG. 9, there are five speech distractors (such as speakers) 910 arranged at different locations/angles on a dt-radius circle and a test microphone 920 arranged at a head and torso simulator's (HATS) mouth reference point (MRP), and voices from each of the five speech distractors 910 need to be suppressed, where dt=60 cm. Please note that the five speech distractors 910 are taken turns to do the tests. That is, for each test, only one of the five speech distractors 910 is arranged on the dt-radius circle at a time. Before test, the level of the distractor mouth is adjusted so that the ratio of the near-end speech (from the HATS mouth) to the distractor speech is 16 dB at HATS MRP (distractor 16 dB quieter). Table 1 shows attenuation requirements for open office headset and the test results for the headset 900 of the invention.

TABLE 1

| Data source | Distractor Attenuation for Open office headsets | Average of all angles | Minimum of all angles |
|---|---|---|---|
| Single speech distractor | MS Teams Spec. | Speech to distractor attenuation SDR (dB) | |
| | Open Office Designation | >=17 | >=14 |
| | Premium | >=23 | >=20 |
| | Baseline Result | 18 | 17 |
| | The headset 900 of the invention | 24 | 20 |

As clearly shown in Table 1, the headset 900 passes the test because the speech to distractor ratios (SDRs) of the headset 900 are higher than the attenuation requirements, where the SDR describes the level ratio of the near end speech compared to the nearby distractor speech. The above test results prove the audio module 600/700 of the invention is capable of suppressing audio signals other than the (headset) user's speech.

The above embodiments and functional operations can be implemented in digital electronic circuitry, in tangibly-embodied computer software or firmware, in computer hardware, including the structures disclosed in this specification and their structural equivalents, or in combinations of one or more of them. The operations and logic flows described in FIGS. 1-5, 6A, 6C-6D, 7A, 7C-7D and 8A~8D can be performed by one or more programmable computers executing one or more computer programs to perform their functions, or by special purpose logic circuitry, e.g., an FPGA (field programmable gate array) or an ASIC (application-specific integrated circuit). Computers suitable for the execution of the one or more computer programs include, by way of example, can be based on general or special purpose microprocessors or both, or any other kind of central processing unit. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. An audio device, comprising:

multiple microphones that generate multiple audio signals; and an audio module coupled to the multiple microphones, comprising:

at least one processor;

at least one storage media including instructions operable to be executed by the at least one processor to perform a set of operations comprising:

producing multiple instantaneous relative transfer functions (IRTFs) using a first known adaptive algorithm according to multiple mic spectral representations for multiple first sample values in current frames of the multiple audio signals; and performing distractor suppression over the multiple mic spectral representations and the multiple IRTFs using an end-to-end neural network to generate a compensation mask; and a post-processing circuit that generates an audio output signal according to the compensation mask;

wherein each IRTF represents a difference in sound propagation between each predefined microphone and a reference microphone of the multiple microphones relative to at least one sound source; and wherein each predefined microphone is different from the reference microphone.

2. The audio device according to claim 1, further comprising:

a loudspeaker that converts a playback audio signal into a sound pressure signal;

wherein the set of operations further comprises:

producing multiple playback transfer functions (PTFs) using a second known adaptive algorithm according to the multiple mic spectral representations and a playback spectral representation for multiple second sample values in a current frame of the playback audio signal; and performing acoustic echo cancellation (AEC) over the multiple mic spectral representations, the multiple IRTFs, the playback spectral representation and the multiple PTFs using the end-to-end neural network to generate the compensation mask;

wherein each PTF indicates a degree of a sound leakage from the loudspeaker to a target microphone of the multiple microphones.

3. The audio device according to claim 2, wherein the first and the second known adaptive algorithms are least mean square (LMS) algorithm.

4. The audio device according to claim 2, wherein each PTF includes multiple PTF elements corresponding to multiple frequency bands, and wherein the operation of producing the PTFs comprises:

for a target frequency band of one PTF, producing a current PTF element for the one PTF using the second known adaptive algorithm according to a first corresponding sample in the playback spectral representation and a difference between an estimated sample and a second corresponding sample in a corresponding mic spectral representation for the target microphone;

wherein the estimated sample is related to a product of a previous PTF element for the one PTF and the first corresponding sample.

5. The audio device according to claim 2, wherein the set of operations further comprises:

performing active noise cancellation (ANC) operations over the multiple first sample values using the end-to-end neural network to generate multiple third sample values.

6. The audio device according to claim 5, wherein the end-to-end neural network comprises:

a time delay neural network (TDNN);

a first long short-term memory (LSTM) network coupled to the output of the TDNN; and a second LSTM network coupled to the output of the TDNN;

wherein the TDNN and the first LSTM network are jointly trained to perform the ANC operations over the first sample values to generate the third sample values;

wherein the TDNN and the second LSTM network are jointly trained to perform the distraction suppression over the multiple mic spectral representations and the multiple IRTFs to generate the compensation mask; and wherein the TDNN and the second LSTM network are jointly trained to perform the AEC over the multiple mic spectral representations, the multiple IRTFs, the playback spectral representation and the multiple PTFs to generate the compensation mask.

7. The audio device according to claim 5, wherein the post-processing circuit modifies a main spectral representation of the multiple mic spectral representations with the compensation mask to generate a compensated spectral representation, and generates the audio output signal according to the multiple third sample values and the compensated spectral representation.

8. The audio device according to claim 1, wherein the compensation mask comprises multiple frequency band gains, each indicating its corresponding frequency band is either speech-dominant or noise-dominant.

9. The audio device according to claim 1, wherein the end-to-end neural network is a deep neural network (DNN), a convolutional neural network (CNN), a recurrent neural network (RNN), a time delay neural network (TDNN) or a combination thereof.

10. The audio device according to claim 1, wherein one of the multiple microphones is selected as the reference microphone according to signal-to-noise ratios or receiving spectrum ranges of the multiple microphones.

11. The audio device according to claim 1, wherein the audio output signal is sent out over a connection link.

12. The audio device according to claim 1, further comprising:

an audio output circuit that is coupled to an output terminal of the post-processing circuit over a connection link and converts the audio output signal into a sound pressure signal.

13. The audio device according to claim 1, wherein the audio module and at least one of the multiple microphones are arranged at a first source device, wherein the other microphones are arranged at a second source device, and wherein the audio module connected to the at least one microphone is coupled to the other microphones over a first connection link and to a sink device over a second connection link.

14. The audio device according to claim 1, wherein the multiple microphones are respectively arranged at two different source devices, and wherein the audio module is arranged at a sink device and coupled to the multiple microphones over two different connection links.

15. The audio device according to claim 1, wherein the multiple microphones are respectively arranged at a first source device, a second source device and a sink device, and the audio module is arranged at the sink device, and wherein the audio module is coupled to the multiple microphones over three different connection links.

16. The audio device according to claim 1, wherein each IRTF includes multiple IRTF elements corresponding to multiple frequency bands, and wherein the operation of producing the IRTFs comprises:

for a target frequency band of one IRTF, producing a current IRTF element for the one IRTF using the first known adaptive algorithm according to a first corresponding sample in a first mic spectral representation for the predefined microphone and a difference between an estimated sample and a second corresponding sample in a second mic spectral representation for the reference microphone;

wherein the estimated sample is related to a product of a previous IRTF element for the one IRTF and the first corresponding sample.

17. An audio apparatus, comprising:

two audio devices of claim 1 that are arranged at two different source devices;

wherein the two audio output signals from the two audio devices are respectively sent to a sink device over a first connection link and a second connection link.

18. The apparatus according to claim 17, further comprising:

an audio output circuit that is arranged at the sink device and converts the two audio output signals into two sound pressure signals.

19. The audio apparatus according to claim 17, wherein the sink device receives the two audio output signals over the first and the second connection links and delivers them over a third connection link.

20. An audio processing method, comprising:

obtaining multiple instantaneous relative transfer functions (IRTFs) using a first known adaptive algorithm according to multiple mic spectral representations for multiple first sample values in current frames of multiple audio signals from multiple microphones;

performing distractor suppression over the multiple mic spectral representations and the multiple IRTFs using an end-to-end neural network to generate a compensation mask; and obtaining an audio output signal according to the compensation mask;

wherein each IRTF represents a difference in sound propagation between each predefined microphone and a reference microphone of the multiple microphones relative to at least one sound source; and wherein each predefined microphone is different from the reference microphone.

21. The method according to claim 20, further comprising:

producing multiple playback transfer functions (PTFs) using a second known adaptive algorithm according to the multiple mic spectral representations and a playback spectral representation for multiple second sample values in a current frame of a playback audio signal for a loudspeaker; and performing acoustic echo cancellation (AEC) over the multiple mic spectral representations, the multiple IRTFs, the playback spectral representation and the multiple PTFs using the end-to-end neural network to generate the compensation mask;

wherein each PTF indicates a degree of a sound leakage from the loudspeaker to a target microphone of the multiple microphones.

22. The method according to claim 21, wherein the first and the second known adaptive algorithms are least mean square (LMS) algorithm.

23. The method according to claim 21, wherein each PTF includes multiple PTF elements corresponding to multiple frequency bands, wherein the step of obtaining the PTFs comprises:

for a target frequency band of one PTF, producing a current PTF element for the one PTF using the second known adaptive algorithm according to a first corresponding sample in the playback spectral representation and a difference between an estimated sample and a second corresponding sample in a corresponding mic spectral representation for the target microphone;

wherein the estimated sample is related to a product of a previous PTF element for the one PTF and the first corresponding sample.

24. The method according to claim 21, further comprising:

performing active noise cancellation (ANC) operations over the multiple first sample values using the end-to-end neural network to generate multiple third sample values.

25. The method according to claim 24, wherein the end-to-end neural network comprises a time delay neural network (TDNN), a first long short-term memory (LSTM) network and a second LSTM network, wherein the TDNN and the first LSTM network are jointly trained to perform the ANC operations over the first sample values to generate the third sample values, wherein the TDNN and the second LSTM network are jointly trained to perform the distraction suppression over the multiple mic spectral representations and the multiple IRTFs to generate the compensation mask, and wherein the TDNN and the second LSTM network are jointly trained to perform the AEC over the multiple mic spectral representations, the multiple IRTFs, the playback spectral representation and the multiple PTFs to generate the compensation mask.

26. The method according to claim 24, wherein the step of obtaining the audio output signal comprises:

modifying a main spectral representation of the multiple mic spectral representations with the compensation mask to obtain a compensated spectral representation; and obtaining the audio output signal according to the third sample values and the compensated spectral representation.

27. The method according to claim 20, wherein the compensation mask comprises multiple frequency band gains, each indicating its corresponding frequency band is either speech-dominant or noise-dominant.

28. The method according to claim 20, further comprising:

selecting one of the multiple microphones as the reference microphone according to either signal-to-noise ratios or receiving spectrum ranges of the multiple microphones.

29. The method according to claim 20, further comprising:

sending out the audio output signal over a connection link.

30. The method according to claim 20, further comprising:

converting the audio output signal into a sound pressure signal.

31. The method according to claim 20, further comprising:

at a first source device with M microphones of the multiple microphones, carrying out the above steps of obtaining the multiple IRTFs, performing and obtaining the audio output signal based on M audio signals of the M microphones;

defining the audio output signal in the first source device as a first signal; and delivering the first signal to a sink device over a first connection link;

at a second source device with N microphones of the multiple microphones, carrying out the above steps of obtaining the multiple IRTFs, performing and obtaining the audio output signal based on N audio signals of the N microphones;

defining the audio output signal in the second source device as a second signal; and delivering the second signal to the sink device over a second connection link; and at the sink device, receiving the first and the second signals over the first and the second connection links, where M, N>1.

32. The method according to claim 20, further comprising:

at a first source device with at least one of the multiple microphones, delivering at least one audio signal from the at least one of the multiple microphones to a second source device with the other microphones over a first connection link;

at the second source device, carrying out the above steps of obtaining the multiple IRTFs, performing and obtaining the audio output signal according to the multiple audio signals; and delivering the audio output signal to a sink device over a second connection link; and at the sink device, receiving the audio output signal over the second connection link; and transmitting the audio output signal over a third connection link.

33. The method according to claim 20, further comprising:

at a first source device with at least one of the multiple microphones, delivering at least one audio signal from the at least one of the multiple microphones to a sink device over a first connection link;

at a second source device with the other microphones, delivering the other audio signals from the other microphones to the sink device over a second connection link; and at the sink device, carrying out the above steps of obtaining the multiple IRTFs, performing and obtaining the audio output signal according to the multiple audio signals; and delivering the audio output signal over a third connection link.

34. The method according to claim 20, further comprising:

at a first source device with a first portion of the multiple microphones, delivering at least one audio signal from the first portion of the multiple microphones to a sink device over a first connection link;

at a second source device with a second portion of the multiple microphones, delivering at least one audio signal from the second portion of the multiple microphones to the sink device over a second connection link;

at the sink device with a third portion of the multiple microphones, performing the above steps of obtaining the multiple IRTFs, performing and obtaining the audio output signal according to the multiple audio signals of the multiple microphones; and delivering the audio output signal over a third connection link;

wherein the multiple microphones are divided into the first, the second and the third portions.

35. The method according to claim 20, wherein each IRTF includes multiple IRTF elements corresponding to multiple frequency bands, wherein the step of obtaining the IRTFs comprises:

for a target frequency band of one IRTF, obtaining a current IRTF element for the one IRTF using the first known adaptive algorithm according to a first corresponding sample in a first mic spectral representation for the predefined microphone and a difference between an estimated sample and a second corresponding sample in a second mic spectral representation for the reference microphone;

wherein the estimated sample is related to a product of a previous IRTF element for the one IRTF and the first corresponding sample.

* * * * *